US010810472B2

(12) United States Patent
Malak et al.

(10) Patent No.: US 10,810,472 B2
(45) Date of Patent: Oct. 20, 2020

(54) TECHNIQUES FOR SENTIMENT ANALYSIS OF DATA USING A CONVOLUTIONAL NEURAL NETWORK AND A CO-OCCURRENCE NETWORK

(71) Applicant: Oracle International Corporation, Redwood Shores, CA (US)

(72) Inventors: Michael Malak, Denver, CO (US); Mark L. Kreider, Arvada, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 103 days.

(21) Appl. No.: 15/976,390

(22) Filed: May 10, 2018

(65) Prior Publication Data

US 2018/0341839 A1 Nov. 29, 2018

Related U.S. Application Data

(60) Provisional application No. 62/511,751, filed on May 26, 2017, provisional application No. 62/512,611, (Continued)

(51) Int. Cl.
*G06K 9/72* (2006.01)
*G06K 9/62* (2006.01)
(Continued)

(52) U.S. Cl.
CPC .......... *G06K 9/726* (2013.01); *G06F 40/205* (2020.01); *G06F 40/30* (2020.01);
(Continued)

(58) Field of Classification Search
CPC ... G06F 17/2705; G06F 17/2785; G06F 40/30
(Continued)

(56) References Cited

U.S. PATENT DOCUMENTS 6,047,283 A 4/2000 Braun
6,556,983 B1 4/2003 Altschuler et al.
(Continued)

FOREIGN PATENT DOCUMENTS

CN 106687952 5/2017
CN 106796595 5/2017
(Continued)

OTHER PUBLICATIONS

Apache Tika—a content analysis toolkit, Copyright 2015 [retrieved Dec. 29, 2015]. Retrieved from the Internet: <URL: http://tika.apache.org/>, 9 pages.
(Continued)

*Primary Examiner* — Jakieda R Jackson
(74) *Attorney, Agent, or Firm* — Kilpatrick Townsend & Stockton LLP

(57) ABSTRACT

Techniques are provided for performing sentiment analysis on words in a first data set. An example embodiment includes generating a word embedding model including a first plurality of features. A value indicating sentiment for the words in the first data set can be determined using a convolutional neural network (CNN). A second plurality of features are generated based on bigrams identified in the data set. The bigrams can be generated using a co-occurrence graph. The model is updated to include the second plurality of features, and sentiment analysis can be performed on a second data set using the updated model.

19 Claims, 24 Drawing Sheets

Related U.S. Application Data filed on May 30, 2017, provisional application No. 62/514,701, filed on Jun. 2, 2017.

(51) Int. Cl.
| | |
|---|---|
| *G06N 5/04* | (2006.01) |
| *G06K 9/00* | (2006.01) |
| *G06K 9/68* | (2006.01) |
| *G06K 9/46* | (2006.01) |
| *G06N 3/04* | (2006.01) |
| *G06F 40/30* | (2020.01) |
| *G06F 40/205* | (2020.01) |
| *G06N 3/08* | (2006.01) |
| *G06N 3/10* | (2006.01) |

(52) U.S. Cl.
CPC ....... *G06K 9/00872* (2013.01); *G06K 9/4628* (2013.01); *G06K 9/627* (2013.01); *G06K 9/6217* (2013.01); *G06K 9/6885* (2013.01); *G06N 3/0454* (2013.01); *G06N 5/046* (2013.01); *G06N 3/082* (2013.01); *G06N 3/105* (2013.01)

(58) Field of Classification Search
USPC .......................................................... 704/9
See application file for complete search history.

(56) References Cited

U.S. PATENT DOCUMENTS

| | | | |
|---|---|---|---|
| 6,807,558 B1 | 10/2004 | Hassett et al. | |
| 7,571,177 B2 | 8/2009 | Damle | |
| 8,155,951 B2 | 4/2012 | Jamieson | |
| 8,234,285 B1 | 7/2012 | Cohen | |
| 8,874,616 B1 | 10/2014 | Coffman et al. | |
| 2002/0107861 A1 | 8/2002 | Clendinning et al. | |
| 2002/0152201 A1 | 10/2002 | Nanavati et al. | |
| 2004/0260695 A1 | 12/2004 | Brill | |
| 2005/0071140 A1 | 3/2005 | Ben-hur et al. | |
| 2005/0278325 A1* | 12/2005 | Mihalcea | G06F 16/3344 |
| 2006/0075021 A1 | 4/2006 | Sugiyama et al. | |
| 2007/0112827 A1 | 5/2007 | Dettinger et al. | |
| 2008/0027929 A1 | 1/2008 | Rice et al. | |
| 2008/0281820 A1 | 11/2008 | Do et al. | |
| 2009/0006460 A1 | 1/2009 | Kleinberg et al. | |
| 2010/0274821 A1 | 10/2010 | Bernstein et al. | |
| 2011/0106791 A1 | 5/2011 | Maim | |
| 2011/0173000 A1* | 7/2011 | Yamamoto | G10L 15/1815 704/240 |
| 2012/0101975 A1 | 4/2012 | Khosravy | |
| 2012/0117076 A1 | 5/2012 | Austermann | |
| 2012/0166180 A1 | 6/2012 | Au | |
| 2012/0253792 A1* | 10/2012 | Bespalov | G06F 16/353 704/9 |
| 2013/0110792 A1 | 5/2013 | Hudis et al. | |
| 2013/0232452 A1 | 9/2013 | Krajec et al. | |
| 2013/0268534 A1* | 10/2013 | Mathew | G06F 17/27 707/740 |
| 2014/0052688 A1 | 2/2014 | Bansal | |
| 2014/0067728 A1 | 3/2014 | Ogren et al. | |
| 2014/0074829 A1 | 3/2014 | Schmidt | |
| 2014/0088944 A1* | 3/2014 | Natarajan | G06Q 30/02 703/13 |
| 2014/0115155 A1 | 4/2014 | Bonchi et al. | |
| 2014/0222181 A1 | 8/2014 | Hemenway et al. | |
| 2014/0337331 A1 | 11/2014 | Hassanzadeh et al. | |
| 2015/0106324 A1 | 4/2015 | Puri et al. | |
| 2015/0370775 A1 | 12/2015 | Bauchot | |
| 2016/0092090 A1 | 3/2016 | Stojanovic et al. | |
| 2016/0092474 A1 | 3/2016 | Stojanovic et al. | |
| 2016/0092475 A1 | 3/2016 | Stojanovic et al. | |
| 2016/0092476 A1 | 3/2016 | Stojanovic et al. | |
| 2016/0092557 A1 | 3/2016 | Stojanovic et al. | |
| 2016/0188701 A1 | 6/2016 | Fapohunda | |
| 2016/0239581 A1* | 8/2016 | Jaidka | G06F 16/345 |
| 2016/0247061 A1* | 8/2016 | Trask | G06N 3/04 |
| 2016/0286544 A1 | 9/2016 | Ikeda et al. | |
| 2016/0314200 A1* | 10/2016 | Markman | G06F 16/287 |
| 2017/0109358 A1* | 4/2017 | Dhara | G06F 16/355 |
| 2017/0270100 A1* | 9/2017 | Audhkhasi | G06F 40/289 |
| 2018/0074786 A1 | 3/2018 | Oberbreckling et al. | |
| 2018/0075104 A1 | 3/2018 | Oberbreckling et al. | |
| 2018/0075115 A1 | 3/2018 | Murray et al. | |
| 2018/0173699 A1* | 6/2018 | Tacchi | G06F 40/30 |
| 2018/0293499 A1* | 10/2018 | He | G06N 3/088 |

FOREIGN PATENT DOCUMENTS

| | | |
|---|---|---|
| JP | 2017534108 | 11/2017 |
| JP | 2017536601 | 12/2017 |
| WO | 2016049437 | 3/2016 |
| WO | 2016049460 | 3/2016 |
| WO | 2016049437 | 3/2017 |

OTHER PUBLICATIONS

Commons VFS—Commons Virtual File System, The Apache Software Foundation, Feb. 28, 2014, Copyright 2002-2014 [retrieved Dec. 29, 2015]. Retrieved from the Internet: <URL: http://commons.apache.org/proper/commons-vfs/index.html>, 2 pages.

Gensim: Topic modelling for humans, [retrieved Dec. 29, 2015]. Retrieved from the Internet: <URL: https://radimrehurek.com/gensim/>, 2 pages.

Apache Hadoop 2.4.1—Hadoop Map Reduce Next Generation—2.4.1—Writing YARN Applications, Jun. 21, 2014 [retrieved Dec. 29, 2015]. Retrieved from the Internet: <URL: http://hadoop.apache.org/docs/r2.4.1/hadoop-yarn/hadoop-yarn-site/WritingYarnApplications.html>, 11 pages.

Apache Hadoop 2.7.1—HDFS Permissions Guide, [retrieved Dec. 29, 2015]. Retrieved from the Internet : <URL: http://hadoop.apache.org/docs/ current/hadoop- project-dist/ hadoop-hdfs/HdfsPermissionsGuide.html>, 6 pages.

Jaccard index—Wikipedia, the free encyclopedia, Wikipedia Foundation, Inc., [retrieved Dec. 29, 2015]. Retrieved from the Internet: <URL: https://en.wikipedia.org/wiki/Jaccard_index>, 5 pages.

K-Means Custering, Wikipedia, the free encyclopedia, Wikipedia Foundation, Inc., [retrieved Dec. 29, 2015]. Retrieved from the Internet: <URL: https://en.wikipedia.org/wiki/K-means_clustering>, 12 pages.

Launching Spark on YARN—Spark 0.9.0 Documentation, [retrieved Dec. 29, 2015]. Retrieved from the Internet: <URL: http://spark.apache.org/docs/0.9.0/running-on-yarn.html>, 4 pages.

Making sense of word2vec, RaRe Technologies, RaRe Machine Learning Blog, Dec. 23, 2014, Copyright 2015 [Dec. 29, 2015]. Retrieved from the Internet: <URL: http://rare-technologies.com/making-sense-of-word2vec/>, 16 pages.

Feature Extraction and Transformation—MLlib—Spark 1.5.2 Documentation, [retrieved Dec. 29, 2015]. Retrieved from the Internet: <URL: http://spark.apache.org/docs/latest/mllib-feature-extraction.html>, 9 pages.

Running Spark on YARN—Spark 1.5.2 Documentation, [retrieved Dec. 29, 2015]. Retrieved from the Internet: <URL: http://spark.apache.org/docs/latest/running-on-yarn.html>, 4 pages.

Securing the Hadoop Ecosystem, ATM (Cloudera) & Tucu (Cloudera), Hadoop Summit, Jun. 2013 [retrieved Dec. 23, 2015]. Retrieved from the Internet: <URL: http://www.slideshare.net/Hadoop_Summit/abdelnur-myers-june261120room230av2>, 27 pages.

Apache Hadoop 2.6.0-cdh5.5.1—Service Level Authorization Guide, [retrieved Dec. 29, 2015]. Retrieved from the Internet: <URL: http://archive.cloudera.com /cdh5/cdh/5/hadoop/hadoop-project-dist/hadoop-common/ServiceLevelAuth.html>, 3 pages.

Sorensen—Dice coefficient—Wikipedia, the free encyclopedia, Wikipedia Foundation, Inc., [retrieved Dec. 29, 2015]. Retrieved from the Internet: <URL: https://en.wikipedia.org/wiki/S%C3%B8rensen%E2%80%93Dice_coefficient>, 4 pages.

(56) References Cited

OTHER PUBLICATIONS

Sqoop User Guide (v1.4.2), [retrieved Dec. 29, 2015]. Retrieved from the Internet: <URL: http://sqoop.apache.org/docs/1.4.2/SqoopUserGuide.html>, 37 pages.
Suffix tree—Wikipedia, the free encyclopedia, Wikipedia Foundation, Inc., [retrieved Dec. 29, 2015]. Retrieved from the Internet: <URL: http://en.wikipedia.org/ wiki/Suffix_tree>, 7 pages.
Commons VFS—Supported File Systems, The Apache Software Foundation, Feb. 28, 2014, Copyright 2002-2014 [retrieved Dec. 29, 2015]. Retrieved from the Internet: <URL: http://commons.apache.org/proper/commons-vfs/filesystems.html>, 6 pages.
Trie—Wikipedia, the free encyclopedia, Wikipedia Foundation, Inc., [retrieved Dec. 29, 2015]. Retrieved from the Internet: <URL: http://en.wikipedia.org/wiki/Trie>, 8 pages.
Tversky index—Wikipedia, the free encyclopedia, Wikipedia Foundation, Inc., [retrieved Dec. 29, 2015]. Retrieved from the Internet: <URL: https://en.wikipedia.org /wiki/Tversky_index>, 2 pages.
Welcome to Apache Flume—Apache Flume, [retrieved Dec. 29, 2015]. Retrieved from the Internet: <URL: http://flume.apache.org/>, 7 pages.
YAGO: A High-Quality Knowledge Base, Max-Planck-Institut für Informatik, [retrieved Dec. 29, 2015]. Retrieved from the Internet: <URL: http://www.mpi-inf.mpg.de/departments/databases-and-information-systems/research/yago-naga/yago//>, 4 pages.
U.S. Appl. No. 14/864,485, Non-Final Office Action dated Oct. 2, 2017, 25 pages.
U.S. Appl. No. 14/864,496, Non-Final Office Action dated Nov. 2, 2017, 20 pages.
U.S. Appl. No. 14/864,505, Non-Final Office Action dated Mar. 7, 2018, 17 pages.
U.S. Appl. No. 14/864,513, Non-Final Office Action dated Dec. 14, 2017, 27 pages.
U.S. Appl. No. 14/864,520, Non-Final Office Action dated Nov. 16, 2017, 23 pages.
Angell et al., Automatic spelling correction using trigram similarity measure, Information Processing & Management, vol. 19, Issue 4, 1983, pp. 255-261 [retrieved Mar. 30, 2016]. Retrieved from the Internet: <URL: https://www.researchgate.net/publication/222341347_Automatic_spelling_correction_using_trigram_similarity_measure>, 3 pages.
Boruvka, "O Jistém Problému Minimálním (On a Certain Minimal Problem)", Práce Moravské přírodovědecké společnosti (Scholarly works, Faculty of Moravian), vol. III, Publication 3, 1926, pp. 37-58.
Buscaldi et al., LIPN-CORE: Semantic Text Similarity using n-grams, WordNet, Syntactic Analysis, ESA and Information Retrieval based Features, Second Joint Conference on Lexical and Computational Semantics Proceedings of the Main Conference and the Shared Task, Jun. 13, 2013, pp. 162-168.
Dave, IndexedRDD: Efficeint Fine-Grained Updates for RDD's, http://www.slideshare.net/SparkSummit/ankur-dave, Jun. 15, 2015, 26 pages.
Edmonds, "Choosing the Word Most Typical in Context: Using a Lexical Co-occurrence Network", Proceedings of the 35th Annual Meeting of the Association for Computational Linguistics, 1997, pp. 507-509 [retrieved Apr. 17, 2017]. Retrieved from the Internet: <URL: https://arxiv.org/pdf/cs/9811009.pdf>, 3 pages.
European Patent Application No. 15781210.8, Office Action dated Feb. 28, 2018, 6 pages.
Florek et al., "Sur la Liaison et la Division des Points d'un Ensemble Fini (On Liaison and Points Dividing a Finite Set)", Colloquium Mathematicae, 2.3-4 (1951): 282-285.
Fu et al., Learning Semantic Hierarchies via Word Embeddings, Proceedings of the 52nd Annual Meeting of the Association for Computational Linguistics, Jun. 23-25, 2014 [retrieved Dec. 29, 2015], pp. 1199-1209. Retrieved from the Internet: <URL: http://ir.hit.edu.cn/~rjfu/ publications/acl2014.pdf>, 11 pages.
Homma et al., An Artificial Neural Network for Spatiotemporal Bipolar patterns: Application to Phoneme Classification, Proceeding NIPS'87 Proceedings of the 1987 International Conference on Neural Information Processing Systems, 1988, pp. 31-40.
Islam et al., Text Similarity Using Google Tri-grams, Proceeding Canadian AI'12 Proceedings of the 25th Canadian conference on Advances in Artificial Intelligence, May 28, 2012, pp. 312-317.
Jaccard, The Distribution of the Flora in the Alpine Zone, New Phytologist, vol. 11, No. 2, Feb. 29, 1912 [retrieved Dec. 29, 2015]. Retrieved from the Internet: <URL: http://www.researchgate.net/profile/Paul_Jaccard/publication/230302439_The_distribution_of_the_flora_in_the_alpine_zone/links/02e7e51cb76619a0fa000000.pdf>, 15 pages.
Kalchbrenner et al., "A Convolutional Neural Network for Modelling Sentences" [retrieved Feb. 2, 2017], published on Apr. 8, 2014. Retrieved from the Internet: <URL: https://arxiv.org/abs/1404.2188>, 11 pages.
Malak, 17 Qualities of the Ideal Recommender System, Data Science Association, Aug. 9, 2014 [retrieved Dec. 29, 2015]. Retrieved from the Internet: <URL: http://datascienceassn.org/content/17-qualities-ideal-recommender-system>, 3 pages.
Malak, Extending Word2Vec for Performance and Semi-Supervised Learning, Oracle, Jun. 15, 2015 [retrieved Dec. 29, 2015]. Retrieved from the Internet: <URL: http://spark-summit.org/2015/talk/extending-word2vec-for-performance-and-semi-supervised-learning>, 39 pages.
Markines et al., Evaluating similarity measures for emergent semantics of social tagging, International World Wide Web Conference 18th, Apr. 24, 2009, pp. 641-650.
Mikolov et al., Exploiting Similarities among Languages for Machine Translation, Sep. 17, 2013 [retrieved Dec. 29, 2015]. Retrieved from the Internet: <URL: http://arxiv.org/pdf/1309.4168.pdf>, 10 pages.
Ouyang et al., "Sentiment Analysis Using Convolutional Neural Network", IEEE International Conference on Computer and Information Technology; Ubiquitous Computing and Communications; Dependable, Autonomic and Secure Computing; Pervasive Intelligence and Computing, Oct. 26-28, 2015, pp. 2359-2364 [retrieved Jun. 1, 2017]. Retrieved from the Internet: <http://ieeexplore.ieee.org/document/7363395/>, 6 pages.
International Application No. PCT/US2015/052190, International Preliminary Report on Patentability dated Apr. 6, 2017, 18 pages.
International Application No. PCT/US2015/052190, International Search Report and Written Opinion dated Dec. 9, 2015, 20 pages.
International Application No. PCT/US2015/052228, International Preliminary Report on Patentability dated Apr. 6, 2017, 8 pages.
International Application No. PCT/US2015/052228, International Search Report and Written Opinion dated Nov. 18, 2015, 11 pages.
Ricci, Part 15: Knowledge-Based Recommender Systems, [retrieved Dec. 29, 2015]. Retrieved from the Internet: <URL: http://www.ics.uci.edu/~welling/teaching /CS77Bwinter12/presentations/course_Ricci/15-KnowledgeBased.pdf>, 58 pages.
Richter et al., Exploiting the Leipzig Corpora Collection, Proceesings of the IS-LTC, Jan. 2006, 6 pages.
Sanborn et al., "A Bigram Extension to Word Vector Representation" [retrieved Apr. 17, 2017]. Retrieved from the Internet:<URL:http://cs229.stanford.edu/proj2014/Adrian%20Sanborn,%20Jacek%20Skryzalin,%20A%20bigram%20extension%20to%20word%20vector%20representation.pdf>, 2014, 5 pages.
Sedding et al., WordNet-based Text Document Clustering, Proceedings of the 3$^{rd}$ Workshop on Robust Methods in Analysis of Natural Language Data, Romand '04, Jan. 1, 2004, pp. 104-113.
Smetanin, N., Fuzzy string search, Nikita's Blog, Mar. 24, 2011 [retrieved Dec. 29, 2015]. Retrieved from the Internet: <URL: http://ntz-develop.blogspot.com/2011 /03/fuzzy-string-search.html>, 13 pages.
Suchanek et al., YAGO: A Core of Semantic Knowledge Unifying WordNet and Wikipedia, WWW 2007, May 8-12, 2007, Banff, Alberta, Canada [retrieved Dec. 29, 2015]. Retrieved from the Internet: <URL:http://www2007.org/papers/paper391.pdf>, 10 pages.
Yang et al., Learning Multi-Relational Semantics Using Neural-Embedding Models, Cornell University Library, Nov. 14, 2014 [retrieved Dec. 29, 2015]. Retrieved from the Internet: <URL: http://arxiv.org/abs/1411.4072>, 5 pages.

(56) References Cited

OTHER PUBLICATIONS

U.S. Appl. No. 14/864,485, Final Office Action dated May 16, 2018, 22 pages.

\* cited by examiner

Data Enrichment Cloud Service | Catalog | Dashboard | Policies | Documentation

<Catalog | pvo_20140917_test1

Save | Cancel

Search

≡≡≡ | Refresh | Reset | Undo | Redo | Recommendations

Transform Script ~602~

Remove 123 columns    ×
Rename Col_0001 to date_time    ×
Rename Col_0003 to date_time_02    ×
Rename Col_0004 to url    ×
Rename Col_0007 to url    ×
Rename Col_0008 to city    ×
Rename Col_0010 to state    ×
Rename Col_0011 to hexid    ×
Rename Col_0019 to ip    ×
Rename Col_0063 to url_02    ×

Recommendations for All ~604~

← Format epoch date as MM/dd/yyyy for column... ×
← Format epoch date as MM/dd/yyyy for column... ×
← Format date as MM/dd/yyyy hh:mm:ss aa... ×
← Format date as yy-M-d H:m:s z for column dat... ×
← Remove time from date_time_02 ×
← Remove date from date_time_02

~606~

| date_time_02 | date | 2012-03-12 09:21:45; 2012-03-07 18:47:25; 2012-03-12 09:35:37; 2012-03-12 08:50:35; 2012-03-06 19:03:37; 2012-03-06 18:59:39; 2012-03-12 09:25:46 2012-03-06 19:08:00 2012-03-15 18:56:34 |
| url | string | http://www.acme.com/SH55126545/VD55177927; http://www.acme.com/SH55126545/VD55179433; http://www.acme.com/SH55126545/VD55149415; http://www.acme.com/SH55126545/VD55170364; http://www.acme.com/SH5587637/VD55178699; http://www.acme.com/SH55126545/VD55173061; http://www.acme.com/SH559040/VD55175948; http://www.acme.com/SH55580165/VD55173281; http://www.acme.com/SH55580165/VD55156528; http://www.acme.com/SH55126554/VD55147564 |
| Col_0005 | string | shoes; clothing; movies; handbags; home&garden; tools; outdoors; games; computers; automotive |
| Col_0006 | string | WABC; WOI; KLKN; WCIB; WJBF; WFTS; WPVI; KSTP; WLS; KSAT |
| uri | string | comcast.net; rr.com; qwest.net; verizon.net; 66.231.145.174; mercydesmoines.org; clearwire-wmx.net; windstream.net; 99.126.116.121 |
| city | string | hawthorne; hendersonville; seminole; adel; new york; carpentersville; eden prairie; chicago; wahoo; charlotte |
| Col_0009 | string | usa |
| state | string | fl; ne; nc; il; ia; mn; pa; in; ny; tx |
| hexid | string | D84F550B-FD75-422A-AB3F-F514357BA6AC; E733FA17-4501-428F-A1C8-1C5BA9AD5ED2; 36F9EA4-9D76-44AE-BC08-6014DFB65B2D; B7C591A2-9277-40CE-87C4-EBC26FFC1BC7; 6186EABD-7700-F17F-0809-5C717AC6CCC9; B15166CA-CFA1-48B9-A884-3C49292AC5F6; 2A078DC0-007E-4C55-B4B4-2CD7A9D2E946; 48B3B5EA-CD07-865D-DB03-C35C19CD9FEF; D4A080B5-E392-4F73-854C-0FE220AEC3D3B; B0DD8E45-455D-42C7-8AEF-BC2C65D14CD3 |
| Col_0012 | string | 25-Sep-89; 15-Sep-88; 26-Mar-85; 20-Sep-91; 30-Apr-74; 17-Feb-87; 14-Aug-88; 1-Aug-93; 14-Oct-88; 30-Nov-85 |
| Col_0013 | string | F; M; U |

| | | |
|---|---|---|
| ☰ \| ⋮⋮⋮ \| ⟳ Refresh \| ↺ Reset \| ↓ Undo \| ↑ Redo \| 👥 Recommendations | | |
| Transform Script | date_time_02 | date | 2012-03-12 09:21:45; 2012-03-07 18:47:25; 2012-03-12 09:35:37; 19:03:37; 2012-03-06 18:59:39; 2012-03-12 09:25:46 2012-03-06 |
| Remove 123 columns ✕ | url | string | http://www.acme.com/SH55126545/VD55177927; http://www.ac http://www.acme.com/SH55126545/VD55149415; http://www.a http://www.acme.com/SH5587637/VD55178699; http://www.acr http://www.acme.com/SH559040/VD55175948; http://www.acm http://www.acme.com/SH580165/VD55156528; http://www.acr |
| Rename Col_0001 to date_time ✕ | Col_0005 | string | shoes; clothing; movies; handbags; home&garden; tools; outdoors |
| Rename Col_0003 to date_time_02 ✕ | Col_0006 | string | WABC; WOI; KLKN; WCJB; WJBF; WFTS; WPVI; KSTP; WLS; KSAT |
| Rename Col_0004 to url ✕ | uri | string | comcast.net; rr.com; qwest.net; verizon.net; 66.231.145; morrisbl wmx.net; windstream.net; 99.126.116.121 |
| Rename Col_0007 to url ✕ | Col_0008 | string | hawthorne; hendersonville; seminole; adel; new york; carpentervill |
| Rename Col_0010 to state ✕ | Col_0009 | string | usa |
| Rename Col_0011 to hexid ✕ | state | string | fl; ne; nc; il; ia; mn; pa; in; ny; tx |
| Rename Col_0019 to ip ✕ | hexid | string | D84F550B-FD75-422A-AB3F-F514357BA6AC; E733FA17-4501-42BI BC08-6014DFB65B2D; B7C591A2-9277-40CE-87C4-EBC26FFC1BC7 B15166CA-CFA1-48B9-A884-3C49292AC5F6; 2A078DC0-007E-4C5 DB03-C35C19CD9FEF; D4A080B5-E392-4F73-854C-0FE20AEC3D3B |
| Rename Col_0063 to url_02 ✕ 612 | Col_0012 | string | 25-Sep-89; 15-Sep-88; 26-Mar85; 20-Sep-91; 30-Apr-74; 17-Feb-87; |
| ◀ ▶ | Col_0013 | string | F; M; U |
| ← Extract quarter_year from date_time_02 ✕ | Col_0014 | number | 28356018097916614455; 28380759836831994911; 28072357283486 |
| ← Extract year from date_time_02 ✕ | | | |
| ← Rename Col_0008 to city ✕ 610 | | | |
| ← Enrich column Col_0008 with city.state ✕ | | | |
| ← Enrich column Col_0008 with city.county ✕ | | | |
| ← Enrich column Col_0008 with city.population ✕ | | | |
| ← Enrich column Col_0008 with city.lat ✕ | | | |
| Recommendations for All | | | |
| 614 | | | |

|       | Word embedding model vectors (300 columns) | | | |
|-------|------|-----|-----|-----|
| The   | 0.3  | 0.5 | ... | 0.1 |
| film  | 0.6  | 0.2 | ... | 0.2 |
| is    | 0.1  | 0.1 | ... | 0.0 |
| a     | 0.9  | 0.3 | ... | 0.5 |
| piece | 1.0  | 0.6 | ... | 0.4 |
| of    | 0.9  | 0.4 | ... | 0.4 |
| work  | 0.7  | 0.9 | ... | 0.1 |

*FIG. 13*

|       | Word embedding model vectors (300 columns) | | | | bigram presence indicators (300 columns) | | | |
|-------|------|-----|-----|-----|---|---|-----|---|
| The   | 0.3  | 0.5 | ... | 0.1 | 0 | 0 | ... | 0 |
| film  | 0.6  | 0.2 | ... | 0.2 | 0 | 0 | ... | 0 |
| is    | 0.1  | 0.1 | ... | 0.0 | 0 | 0 | ... | 0 |
| a     | 0.9  | 0.3 | ... | 0.5 | 0 | 0 | ... | 0 |
| piece | 1.0  | 0.6 | ... | 0.4 | 1 | 0 | ... | 0 |
| of    | 0.9  | 0.4 | ... | 0.4 | 1 | 0 | ... | 0 |
| work  | 0.7  | 0.9 | ... | 0.1 | 1 | 0 | ... | 0 |

("piece", "work") ("great", "film")

*FIG. 15*

TECHNIQUES FOR SENTIMENT ANALYSIS OF DATA USING A CONVOLUTIONAL NEURAL NETWORK AND A CO-OCCURRENCE NETWORK

CROSS-RELATED APPLICATIONS

This application claims priority to U.S. Provisional Application No. 62/511,751, filed May 26, 2017, U.S. Provisional Application No. 62/512,611, filed May 30, 2017, and U.S. Provisional Application No. 62/514,701, filed Jun. 2, 2017, the disclosures of which are hereby incorporated by reference in their entirety for all purposes.

The present application is related to the following applications:
1) U.S. Non-Provisional Provisional patent application Ser. No. 14/864,496, entitled "DECLARATIVE LANGUAGE AND VISUALIZATION SYSTEM FOR RECOMMENDED DATA TRANSFORMATIONS AND REPAIRS" and filed on Sep. 24, 2015;
2) U.S. Non-Provisional Provisional patent application Ser. No. 14/864,485, entitled "TECHNIQUES FOR SIMILARITY ANALYSIS AND DATA ENRICHMENT USING KNOWLEDGE SOURCES" and filed on Sep. 24, 2015;
3) U.S. Non-Provisional Provisional patent application Ser. No. 14/864,505, entitled "DYNAMIC VISUAL PROFILING AND VISUALIZATION OF HIGH VOLUME DATASETS AND REAL-TIME SMART SAMPLING AND STATISTICAL PROFILING OF EXTREMELY LARGE DATASETS" and filed on Sep. 24, 2015;
4) U.S. Non-Provisional Provisional patent application Ser. No. 14/864,513, entitled "AUTOMATED ENTITY CORRELATION AND CLASSIFICATION ACROSS HETEROGENEOUS DATASETS" and filed on Sep. 24, 2015; and
5) U.S. Non-Provisional Provisional patent application Ser. No. 14/864,520, entitled "DECLARATIVE EXTERNAL DATA SOURCE IMPORTATION, EXPORTATION, AND METADATA REFLECTION UTILIZING HTTP AND HDFS PROTOCOLS" and filed on Sep. 24, 2015.

The entire contents of the above-identified patent applications are incorporated herein by reference for all purposes.

BACKGROUND

The present disclosure relates generally to data analysis and processing. More particularly, techniques are disclosed for analysis, processing, generation, and visualization of data obtained from multiple data sources.

Before "big data" systems can analyze data to provide useful results, the data needs to be added to the big data system and formatted such that it can be analyzed. This data onboarding presents a challenge for current cloud and "big data" systems. Typically, data being added to a big data system is noisy (e.g., the data is formatted incorrectly, erroneous, outdated, includes duplicates, etc.). When the data is analyzed (e.g., for reporting, predictive modeling, etc.) the poor signal to noise ratio of the data means the results are not useful. As a result, current solutions require substantial manual processes to clean and curate the data and/or the analyzed results. However, these manual processes cannot scale. As the amount of data being added and analyzed increases, the manual processes become impossible to implement.

The rapid proliferation of data from a variety of sources: internal and external, unstructured and structured, traditional and new data types, presents an enormous opportunity for businesses to gain valuable insights that can help them make improved and timely decisions that will win, serve, and retain customers. A key part of preparing these data sources for analysis is the ability to merge or join (e.g., blend) two or more datasets originating from different sources into a single file ready to be used for further processing, such as by a big data analytics system. The heterogeneity and size of datasets introduce tremendous challenges to understand the meaning of words, which could be used as a basis for downstream applications, such as identifying messages on a social media website or a communication feed about a particular product.

Data from disparate sources may include different types of data having different formats. For example, data from an enterprise may be different than data from click stream or error logs, or structured data from social media sources. Users may desire to use data from multiple sources to build a data lake, to perform downstream processing for applications, and to perform ETL (extract, transform, and load) processing. The data from web logs and social media may be completely unrelated to data about transactions for users. A significant amount of time, money, and computing resources may be spent to utilize data from various sources to understand the data.

Some have utilized supervised learning along with statistical natural language processing (NLP) to attempt to understand the meaning of words in data. Determining the meaning of images poses a different challenge. These techniques are unable to capture the meaning or sentiment of words that have a relationship with respect to other words and/or depend on a particular arrangement associated with a meaning. Further, such systems may have low accuracy in determining sentiment from words.

Certain embodiments address these and other problems. Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF SUMMARY

The present disclosure relates generally to techniques (e.g., systems, methods, and operations) for analysis, processing, generation and visualization of data obtained from one or more data sources. Such techniques may be implemented as a computer-based system, which can be implemented in an enterprise computing system or cloud computing system. The computer system may be implemented as a cloud-based service. Specifically, system may implement techniques to assess the sentiment of messages in data from one or more data sources. A variety of techniques including convolutional neural networks (CNNs), a co-occurrence graph, and bigrams, may be utilized in a non-obvious way to improve the accuracy of sentiment analysis.

Some embodiments disclosed herein may be implemented by a computer system that is configured to implement methods and operations disclosed herein. Some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

It may often be beneficial to determine sentiment from data. Sentiment can indicate a view or attitude toward a situation or an event. Further, identifying sentiment in data can be used to determine a feeling, emotion or an opinion. A data analyst, for example, may want to determine sentiment from data. Although a data analyst is described, users other than a data analyst may desire to identify sentiment information. For example, a data analyst may have a collection of movie review data, and the data analyst would like to determine the reviewer's thoughts on the movie. Specifically, the data analyst would like to determine whether the review of the movie was positive or negative.

However, given that there can be large amounts of data it can be difficult for the data analyst to go through all of the data in order to determine the sentiment. For example, there can be millions of movie reviews for a movie and it would be difficult for the data analyst to go through each of the reviews in order to determine sentiment. In addition, it can be difficult to perform accurate sentiment analysis. Neural networks may be used to determine sentiment, however, neural networks alone may not provide accurate results as desired by a user. Therefore, an example embodiment provides a fast and efficient method for determining sentiment from data. Further, an example embodiment increases accuracy by adding machine learning features.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 6A-6D depict examples of a user interface that provides interactive data enrichment, in accordance with some example embodiments.

FIGS. 7A-7D depict examples of the results of interactive data enrichment, in accordance with some example embodiments.

FIG. 13 illustrates a matrix including word embedding model vectors, in accordance with some example embodiments.

FIG. 15 illustrates a matrix including word embedding model vectors and bigram vectors, in accordance with some example embodiments.

DETAILED DESCRIPTION

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

Example embodiments generally to a data service that analyzes, prepares, extracts, repairs, generates, and/or enriches data obtained from one or more data sources. Specifically, techniques disclosed herein enable sentiment analysis to be performed. The sentiment analysis can be provided in a display to enable a user to understand the meaning of words in the data. The analysis of sentiment may improve the accuracy of results for assessing the sentiment of data. The techniques disclosed herein may reduce the processing by a computer system for assessing sentiment.

In certain embodiments, prior to loading data into a data warehouse (or other data target) the data is processed through a pipeline (also referred to herein as a semantic pipeline) which includes various processing stages. In some embodiments, the pipeline can include an ingest stage, prepare stage, profile stage, transform stage, and publish stage. During processing, the data can be analyzed, prepared, and enriched. The resulting data can then be published (e.g., provided to a downstream process) into one or more data targets (such as local storage systems, cloud-based storage services, web services, data warehouses, etc.) where various data analytics can be performed on the data. Because of the repairs and enrichments made to the data, the resulting analyses produce useful results. Additionally, because the data onboarding process is automated, it can be scaled to process very large data sets that cannot be manually processed due to volume.

Data Enrichment

Figure 1:
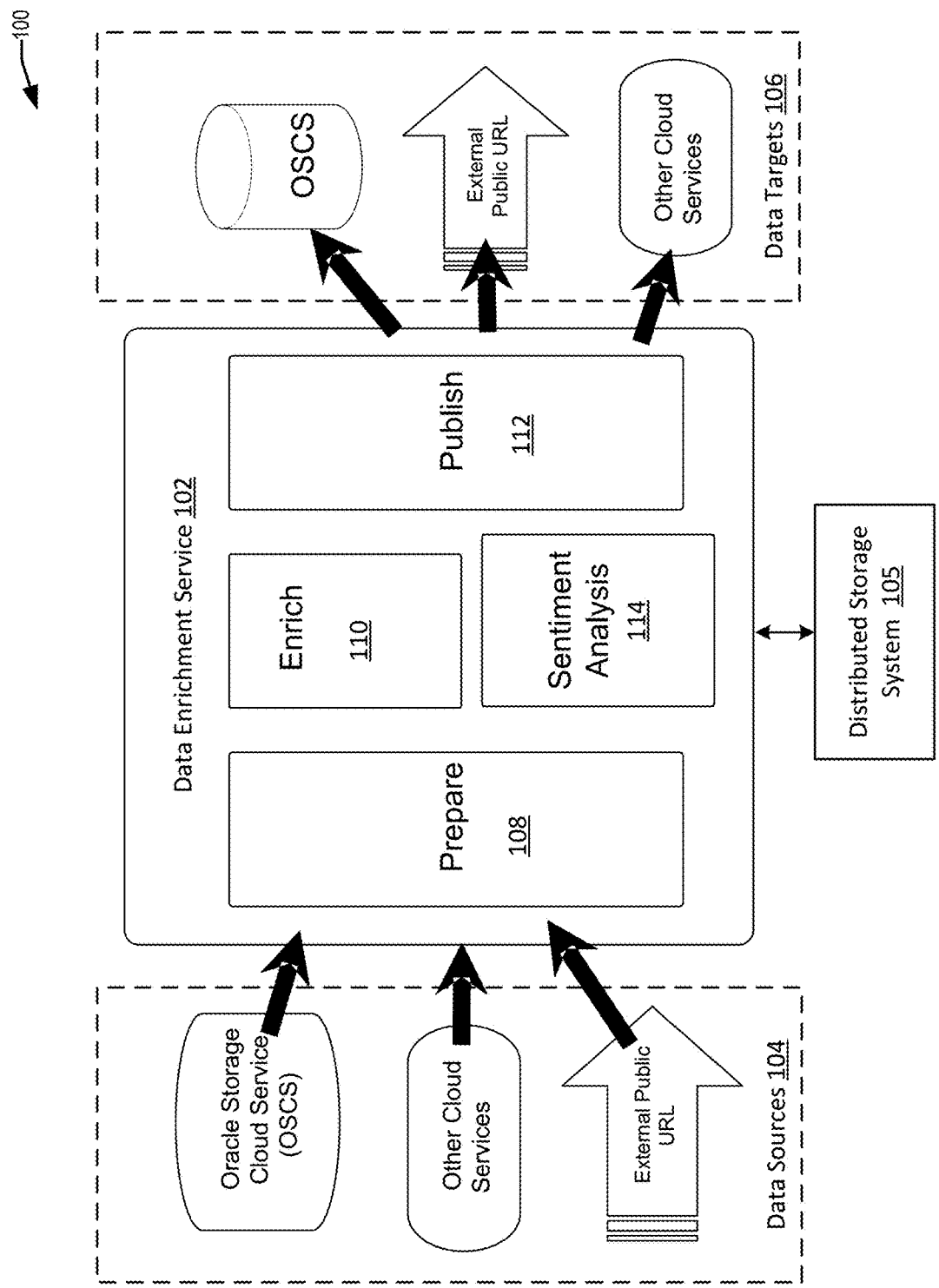
FIG. 1 depicts a simplified high level diagram of a data enrichment service, in accordance with some example embodiments.

FIG. 1 depicts a simplified high-level diagram 100 of a data service, in accordance with some example embodiments. The data service may be referred to herein as "a data enrichment service," and "a preparation service." As shown in FIG. 1, a cloud-based data enrichment service 102 can receive data from various data sources 104. In some embodiments, a client can submit a data enrichment request to data enrichment service 102 which identifies one or more of the data sources 104 (or portions thereof, e.g., particular tables, datasets, etc.). The data enrichment service 102 may then request data to be processed from the identified data sources 104. In some embodiments, the data sources may be sampled, and the sampled data analyzed for enrichment, making large data sets more manageable. The identified data can be received and added to a distributed storage system (such as a Hadoop Distributed Storage (HDFS) system) accessible to the data enrichment service. The data may be processed semantically by a number of processing stages (described herein as a pipeline or semantic pipeline). These processing stages can include preparation stages 108, enrichment stages 110, and publishing stages 112. In some embodiments, data can be processed in one or more batches by the data enrichment services. In some embodiments, a streaming pipeline can be provided that processes data as it is received.

In some embodiments, a prepare stage 108 can include various processing sub-stages. This may include automatically detecting a data source format and performing content extraction and/or repair. Once the data source format is identified, the data source can be automatically normalized into a format that can be processed by the data enrichment service. In some embodiments, once a data source has been prepared, it can be processed by an enrich stage 110. In some embodiments, inbound data sources can be loaded into a distributed storage system 105 accessible to the data enrichment service (such as an HDFS system communicatively coupled to the data enrichment service). The distributed storage system 105 provides a temporary storage space for ingested data files, which can then also provide storage of intermediate processing files, and for temporary storage of results prior to publication. In some embodiments, enhanced or enriched results can also be stored in the distributed storage system. In some embodiments, metadata captured during enrichment associated with the ingested data source can be stored in the distributed storage system 105. System level metadata (e.g., that indicates the location of data sources, results, processing history, user sessions, execution history, and configurations, etc.) can be stored in the distributed storage system or in a separate repository accessible to the data enrichment service.

In some embodiments, data enrichment service 102 may provide sentiment analysis 114 functionality for analyzing sentiment of data from different data sources using techniques disclosed herein. Techniques include the application of convolutional neural networks (CNNs), a lexical co-occurrence network, and bigram word vectors to perform sentiment analysis to improve accuracy of analysis.

In certain embodiments, the enrichment process 110 can analyze the data using a semantic bus (also referred to herein as a pipeline or semantic pipeline) and one or more natural language (NL) processors that plug into the bus. The NL processors can automatically identify data source columns, determine the type of data in a particular column, name the column if no schema exists on input, and/or provide metadata describing the columns and/or data source. In some embodiments, the NL processors can identify and extract entities (e.g., people, places, things, etc.) from column text. NL processors can also identify and/or establish relationships within data sources and between data sources. As described further below, based on the extracted entities, the data can be repaired (e.g., to correct typographical or formatting errors) and/or enriched (e.g., to include additional related information to the extracted entities).

In some embodiments, a publish stage 112 can provide data source metadata captured during enrichment and any data source enrichments or repairs to one or more visualization systems for analysis (e.g., display recommended data transformations, enrichments, and/or other modifications to a user). The publishing sub-system can deliver the processed data to one or more data targets. A data target may correspond to a place where the processed data can be sent. The place may be, for example, a location in memory, a computing system, a database, or a system that provides a service. For example, a data target may include Oracle Storage Cloud Service (OSCS), URLs, third party storage services, web services, and other cloud services such as Oracle Business Intelligence (BI), Database as a Service, and Database Schema as a Service. In some embodiments, a syndication engine provides customers with a set of APIs to browse, select, and subscribe to results. Once subscribed and when new results are produced, the results data can be provided as a direct feed either to external web service endpoints or as bulk file downloads.

Through this disclosure, various flowcharts and techniques are disclosed illustrating processes according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in the figures may be implemented in software (e.g., code, instructions, program) executed by one or more processing units (e.g., processors cores), hardware, or combinations thereof. For example, data enrichment service 102 can be implemented by a computer system for the processes described with reference to any of the figures. Any of the processes may be implemented as a service. In some embodiments, any of the elements in the figures may be implemented with more or fewer subsystems and/or modules than shown in the figure, may combine two or more subsystems and/or modules, or may have a different configuration or arrangement of subsystems and/or modules. Subsystems and modules may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

The particular series of processing steps in the figures is not intended to be limiting. Other sequences of steps may also be performed according to alternative embodiments. For example, alternative embodiments may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, data may be stored using one or more data structures. Data structures may be organized in a variety of ways depending on how, what, and/or where data is stored. Although each of the data structures are shown including particular data, more or fewer data structures may be implemented to store the data. A data structure can include a reference to other data structures. The data structures may be implemented using one or more types of data structures including, without restriction, a linked list, an array, a hashtable, a map, a record, a graph, or other type of data structure. A data structure may be implemented in a hierarchical manner. Each of the data structures may be defined in a declarative manner based on input by a user. The data structures can be defined based on a template, e.g., a template defined based on a markup language, such as Extended Markup Language (XML). A data structure may have one or more formats, also referred to as a document format.

Figure 2:
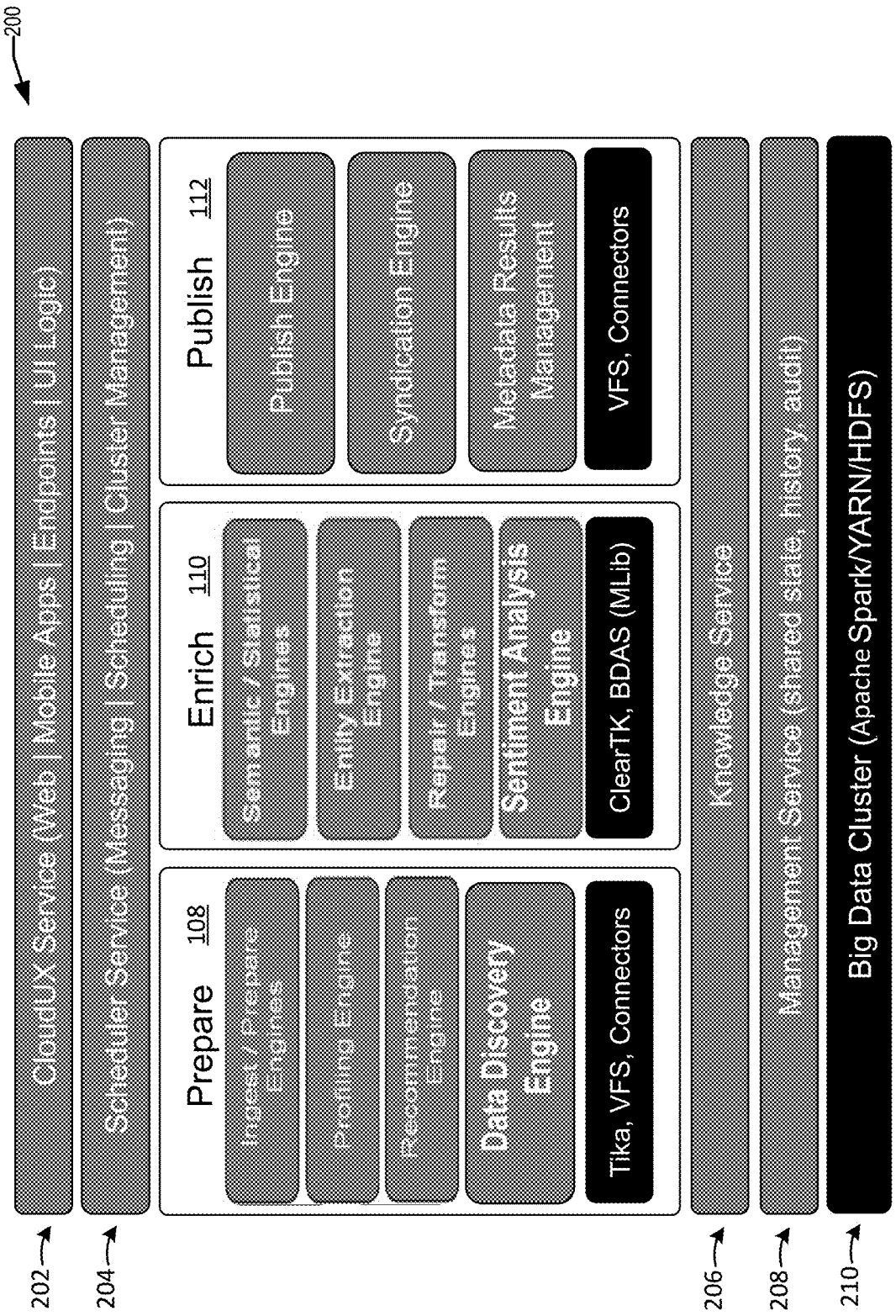
FIG. 2 depicts a simplified block diagram of a technology stack, in accordance with some example embodiments.

FIG. 2 depicts a simplified block diagram 200 of a technology stack or system, in accordance with some example embodiments. In some embodiments, the data enrichment service can be implemented using the logical technology stack shown in FIG. 2. The technology stack can include a user interface/experience (UX) layer 202 that provides access to the data enrichment service through one or more client devices (e.g., using a thin client, thick client, web browser, or other application executing on the client devices). A scheduler service 204 can manage requests/responses received through the UX layer and can manage the underlying infrastructure on which the data enrichment service executes.

In some embodiments, the processing stages described above with respect to FIG. 1, can include a number of processing engines. For example, the prepare processing stage 108 can include ingest/prepare engines, a profiling engine, a recommendation engine, and a sentiment analysis engine. As data is ingested during prepare processing, the data (or samples thereof) can be stored in a distributed data storage system 210 (such as a "big data" cluster). Data preparation can include functions for sentiment analysis to determining a meaning of text in data. The enrich processing stage 110 can include statistical engines, an entity extraction engine, repair/transform engines, and a semantic analysis engine. Semantic analysis engine may be implemented in all or some parts of system 200. As described further below, the enrich processing stage 110 can utilize information obtained from knowledge service 206 during the enrichment process. Enrichment actions (e.g., the addition and/or transformation of data) can be performed on the data stored in the distributed storage system 210. Enrichment actions can include merging or blending of datasets from one or more data sources. Transformation of data may include modification to add missing data or data to enrich the data. Transformation of data may include modifying errors in the data or repairing the data. Transformation may include merging or blending of datasets from one or more data sources. The publish processing stage 112 can include a publish engine, a syndication engine, and a metadata results manager. In some embodiments, various open source technologies can be used to implement some functionality within the various processing stages and/or processing engines. For example, file format detection can use Apache Tika.

In some embodiments, a management service 208 can monitor changes made to the data during enrichment processing 110. The monitored changes can include tracking which users accessed the data, which data transformations were performed, and other data. This can enable the data enrichment service to roll back enrichment actions.

Technology stack 200 can be implemented in an environment such as a cluster 210 for big data operations ("Big Data Cluster"). Cluster 210 can be implemented using Apache Spark, which provides a set of libraries for implementing a distributed computing framework compatible with a distributed file system (DFS) such as HDFS. Apache Spark can send requests for map, reduce, filter, sort, or Sample cluster processing jobs to effective resource managers like YARN. In some embodiments, cluster 210 can be implemented using a distributed file system offering such as one offered by Cloudera®. The DFS, such as one offered by Cloudera®, may include HDFS and Yarn.

Figure 3:
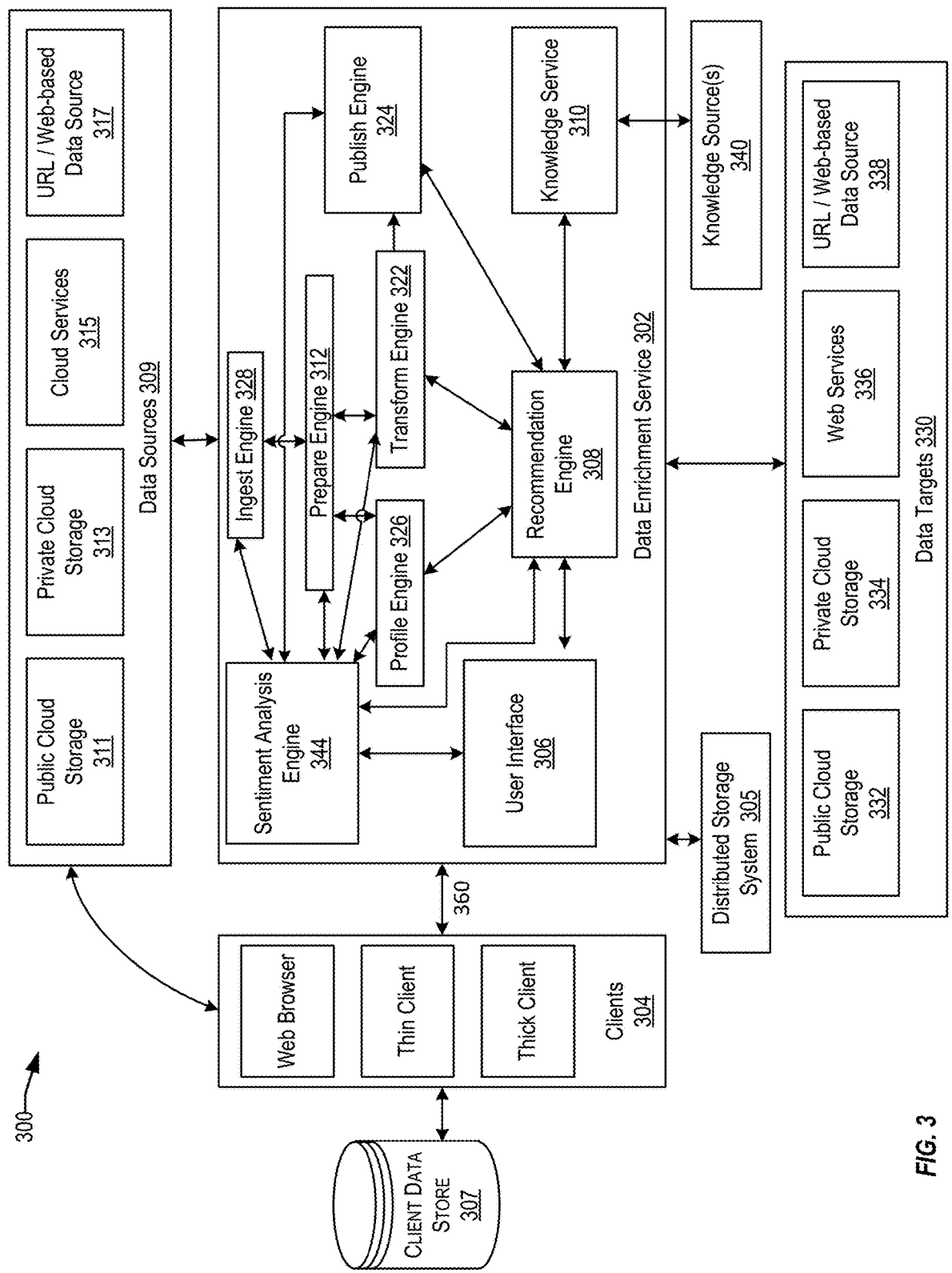
FIG. 3 depicts a simplified block diagram of an interactive visualization system, in accordance with some example embodiments.

FIG. 3 depicts a simplified block diagram of data enrichment system 300, in accordance with some example embodiments. Data enrichment system 300 may implement a data enrichment service 302. Data enrichment service 302 can receive data enrichment requests from one or more clients 304. Data enrichment service 302 may comprise one or more computers and/or servers. Data enrichment service 302 may be a module that is comprised of several subsystems and/or modules, including some, which may not be shown. Data enrichment service 302 may have more or fewer subsystems and/or modules than shown in the figure, may combine two or more subsystems and/or modules, or may have a different configuration or arrangement of subsystems and/or modules. In some embodiments, data enrichment service 302 may include user interface 306, ingest engine 328, recommendation engine 308, knowledge service 310, profile engine 326, transform engine 322, a prepare engine 312, publish engine 324, and sentiment analysis engine 344. The elements implementing data enrichment service 302 may operate to implement a semantic processing pipeline as described above.

Data enrichment system 300 may include a semantic processing pipeline, in accordance with some example embodiments. All or part of the semantic processing pipeline may be implemented by data enrichment service 102. When a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below.

In some embodiments, data enrichment service 302 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The clients 304 can include various client devices (such as desktop computers, laptop computers, tablet computers, mobile devices, etc.). Each client device can include one or more client applications through which the data enrichment service 302 can be accessed. For example, a browser application, a thin client (e.g., a mobile app), and/or a thick client can execute on the client device and enable the user to interact with the data enrichment service 302. The embodiment depicted in FIG. 3 is merely an example and is not intended to unduly limit the example embodiments. One of ordinary skill in the art would recognize many variations, alternatives, and modifications. For example, there may be more or fewer client devices than those shown in the figures.

The client devices 304 may be of various different types, including, but not limited to personal computers, desktops, mobile or handheld devices such as a laptop, a mobile phone, a tablet, etc., and other types of devices. A communication network facilitates communications between client devices 304 and data enrichment service 302. The communication network can be of various types and can include one or more communication networks. Examples of communication network 360 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients 304 and data enrichment service 302.

A user can interact with the data enrichment service 302 through user interface 306. Clients 304 can render a graphical user interface to display the user's data, recommendations for transforming the user's data, and to send and/or receive instructions ("transformation instructions") to the data enrichment service 302 through user interface 306. The user interfaces disclosed herein, such as those references in FIGS. 6A-6D and 7A-7D may be rendered by data enrichment service 302 or via clients 304. For example, a user interface may be generated by user interface 306, and rendered by data enrichment service 302 at any one of clients 304. A user interface may be provided by data enrichment system 302 via network as part of a service (e.g., a cloud service) or a network-accessible application. In at least one example, an operator of a data enrichment service 302 may operate one of clients 304 to access and interact with any user interfaces disclosed herein. The user can send instructions to user interface 306 to add data sources (e.g., provide data source access and/or location information, etc.).

Data enrichment service 302 may ingest data using ingest engine 328. Ingest engine 328 can serve as an initial processing engine when a data source is added. The ingest engine 328 can facilitate safe, secure, and reliable uploading of user data from one or more data sources 309 into data enrichment service 302. In some embodiments, ingestion engine 328 can extract data from the one or more data sources 309 and store it in a distributed storage system 305 in data enrichment service 302. Data ingested from one or more data sources 309 and/or one or more clients 304 can be processed as described above with respect to FIGS. 1-2 and stored in a distributed storage system 305. Data enrichment service 302 can receive data from a client data store 307 and/or from one or more data sources 309. The distributed storage system 305 can serve as temporary storage for the uploaded data during the remaining processing stages of the pipeline, prior to the data being published to one or more data targets 330. Once an upload is complete, the prepare engine 312 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 311, a private cloud storage service 313, various other cloud services 315, a URL or web-based data source 317, or any other accessible data source. A data enrichment request from the client 304 can identify a data source and/or particular data (tables, columns, files, or any other structured or unstructured data available through data sources 309 or client data store 307). Data enrichment service 302 may then access the identified data source to obtain the particular data specified in the data enrichment request. Data sources can be identified by address (e.g., URL), by storage provider name, or other identifier. In some embodiments, access to a data source may be controlled by an access management service. The client 304 may display a request to the user to input a credential (e.g., username and password) and/or to authorize the data enrichment service 302 to access the data source.

In some embodiments, data uploaded from the one or more data sources 309 can be modified into various different formats. The prepare engine 312 can convert the uploaded data into a common, normalized format, for processing by data enrichment service 302. Normalizing may be performed by routines and/or techniques implemented using instructions or code, such as Apache Tika distributed by Apache®. The normalized format provides a normalized view of data obtained from the data source. In some embodiments, the prepare engine 312 can read a number of different file types. Prepare engine 312 can normalize the data into a character separated form (e.g., tab separated values, comma separated values, etc.) or as a JavaScript Object Notation (JSON) document for hierarchical data. In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 312 can perform context extraction and conversion to the file types expected by data enrichment service 302, and can extract document level metadata from the data source.

Normalizing a data set mat include converting raw data in a data set into a format that is processable by the data enrichment service 302, in particular profile engine 326. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 326. Data may be normalized by being modified or converted from a non-tabular format to a tabular format, having one or more columns of data.

Once the data has been normalized, the normalized data can be passed to profile engine 326. The profile engine 326 can perform a column by column analysis of normalized data to identify the types of data stored in the columns and information about how the data is stored in the columns. In this disclosure, although profile engine 326 is described in many instances as performing operations on data, the data processed by profile engine 326 has been normalized by prepare engine 312. In some embodiments, the data processed by profile engine 326 may include data that is not normalized for being in a format (e.g., a normalized format) processable by profile engine 326. The output, or results, of profile engine 326 may be metadata (e.g., source profile) indicating profile information about the data from a source. The metadata may indicate one or more patterns about the data and/or a classification of the data. As further described below, the metadata may include statistical information based on analysis of the data. For example, profile engine 326 can output a number of metrics and pattern information about each identified column, and can identify schema information in the form of names and types of the columns to match the data.

The metadata generated by profile engine 326 may be used by other elements of data enrichment service, e.g., recommendation engine 308 and transformation engine 322, to perform operations as described herein for data enrichment service 302. In some embodiments, the profile engine 326 can provide metadata to a recommendation engine 308.

Recommendation engine 308 can identify repair, transform, and data enrichment recommendations for the data processed by profile engine 326. The metadata generated by profile engine 326 can be used to determine recommendations for data based on the statistical analysis and/or classifications indicated by the metadata. In some embodiments, recommendations can be provided to the user through a user interface or other web service. Recommendations can be tailored for business users, such that the recommendations describe at a high level what data repairs or enrichments are available, how those recommendations compare to past user activity, and/or how unknown items can be classified based on existing knowledge or patterns. Knowledge service 310 can access one or more knowledge graphs or other knowledge sources 340. The knowledge sources can include publicly available information published by web sites, web services, curated knowledge stores, and other sources. Recommendation engine 308 can request (e.g., query) knowledge service 310 for data that can be recommended to a user for the data obtained for a source.

In some embodiments, transform engine 322 can present the user with the sampled data for each column, or sample rows from the input dataset through user interface 306. Through user interface 306, data enrichment service 302 may present a user with recommended transformations. The transformations may be associated with transformation instructions, which may include code and/or function calls to perform transformation actions. The transformation instructions may be invoked by a user based on selection at user interface 306, such as by selecting a recommendation for transformation or by receiving input indicating an operation (e.g., an operator command). In one example, transformation instructions include a transformation instruction to rename at least one column of data based on the entity information. A further transformation instruction can be received to rename the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 306, a user can perform transform actions, and the transform engine 322 can apply them to the data obtained from a data source and display the results. This gives the user immediate feedback that can be used to visualize and verify the effects of the transform engine 322 configuration. In some embodiments, the transform engine 322 can receive pattern and/or metadata information (e.g., column names and types) from profile engine 326 and recommendation engine 308, which provides recommended transform actions. In some embodiments, transform engine 322 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 308 for that column can also be removed. Similarly, if a transform action results in inserting new columns and that action is deleted, then any actions performed on the new columns are also deleted.

As described above, during processing the received data can be analyzed and a recommendation engine 308 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 326 and the recommendation for enriching the data determined by recommendation engine 308. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 302 may be stored in an intermediary data format including, but not limited to, RDD, text, a document format, any other type of format, or a combination thereof. The data stored in the intermediary format may be used to further perform operations for data enrichment service 302.

The following tables illustrate examples of transformations. Table 1 shows an outline of types of transforms actions.

TABLE 1

| Transform Types | Function Parameter(s) | Description | Examples |
|---|---|---|---|
| Update | String => String | Update column values | Obfuscate, date format, |
| Split | String => Array[String] | Split a column's values into new columns | Regex split, delimiter split |
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |
| Insert | String => Array[String] | Insert new columns | Insert timestamp |
| Insert 1: M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

TABLE 3

| Transform Actions | Description | Input | Output | R1 |
|---|---|---|---|---|
| Obfuscate | Obfuscate sensitive information such as e.g. credit card numbers, ID's, or birth dates | 123-45-6789 | ###-##-#### | Y |
| Date Reformat | Reformat a column containing a date | 1330978536 2012-03-12 14:13:49 | March 05, 2012 03/12/12 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone | Keep all rows whose values contain "Android" or "iPhone" | Y |

The recommendation engine 308 can use information from a knowledge service 310, knowledge source 340 to generate recommendations for transform engine 322 and to instruct transform engine 322 to generate transform scripts that will transform the data. Transform scripts may include programs, code, or instructions that may be executable by one or more processing units to transform received data. As such, the recommendation engine 308 can serve as an intermediary between the user interface 306 and the knowledge service 310.

As discussed above, profile engine 326 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexi-decimal identifiers, social security numbers, US box numbers, typical US street address patterns, zipcodes, US phone numbers, suite numbers, credit card numbers, proper names, personal information, and credit card vendors.

In some embodiments, profile engine 326 may identify patterns in data based on a set of regular expressions defined by semantic constraints or syntax constraints. A regular expression may be used to determine the shape and/or structure of data. Profile engine 326 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 326 may perform parsing operations using one or more regular expressions to identify patterns in data processed by profile engine 326. Regular expressions may be ordered according to a hierarchy. Patterns may be identified based on order of complexity of the regular expressions. Multiple patterns may match data that is being analyzed; the patterns having the greater complexity will be selected. As described further below, profile engine 326 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 326 may perform statistical analysis to disambiguate the patterns and/or the text in data. Profile engine 326 may generate metadata including statistical information based on the statistical analysis. When patterns are identified, profile engine 326 may determine statistical information (e.g., a pattern metric) about each different pattern to disambiguate between the patterns. The statistical information may include a standard deviation for different patterns that are recognized. The metadata including the statistical information can be provided to other components of data enrichment service 302, such as recommendation engine 308. For example, the metadata may be provided to recommendation engine 308 to enable recommendation engine 308 to determine recommendations for enrichment of the data based on the identified the pattern(s). Recommendation engine 308 can use the patterns to query a knowledge service 310 to obtain additional information about the patterns. Knowledge service 310 can include or have access to one or more knowledge sources 340. A knowledge sources can include publicly available information published by web sites, web services, curated knowledge stores, and other sources.

Profile engine 326 may perform the statistical analysis to disambiguate between patterns identified in the data. For example, data analyzed by profile engine 326, may be evaluated to compute a pattern metric (e.g., a statistical frequency of different patterns in the data) for each of the different patterns identified in the data. Each of the set of pattern metrics is computed for a different pattern of the patterns that are identified. Profile engine 326 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 326 may convert the dates to a standard format in addition to normalization and may then determine a standard deviation for each format from different patterns. In this example, profile engine 326 may statistically disambiguate between the formats in the data as having the format with the lowest standard deviation. The pattern corresponding to the format of the data having the lowest standard deviation may be selected as the best pattern for the data.

Profile engine 326 may determine a classification of a pattern that it identifies. Profile engine 326 may communicate with knowledge service 310 to determine whether the identified pattern can be classified within a knowledge domain. Knowledge service 310 may determine one or more possible domains associated with the data based on techniques described herein such as matching techniques and similarity analysis. Knowledge service 310 may provide profile engine 326 with a classification of one or more domains possibly similar to data identified with a pattern. Knowledge service 310 may provide, for each of the domains identified by knowledge service 310, a similarity metric indicating a degree of similarity to the domain. The techniques disclosed herein for similarity metric analysis and scoring can be applied by recommendation engine 308 to determine a classification of data processed by profile engine 326. The metadata generated by profile engine 326 may include information about the knowledge domain, if any are applicable, and a metric indicating a degree of similarity with the data analyzed by profile engine 326.

Profile engine 326 may perform statistical analysis to disambiguate text identified in data, regardless of whether patterns are identified in the data. The text may be part of a pattern, and the analysis of the text may be used to further identify a pattern, if any can be identified. Profile engine 326 may request knowledge service 310 to perform domain analysis on text to determine whether the text can be classified into one or more domains. Knowledge service 310 may operate to provide information about one or more domains that are applicable to the text being analyzed. Analysis performed by knowledge service 310 to determine a domain may be performed using techniques described herein, such as similarity analysis used to determine a domain for data.

In some embodiments, profile engine 326 may identify text data in a data set. The text data may correspond to each entity identified in the set of entities. A classification may be determined for each entity that is identified. Profile engine 326 may request knowledge service to identify a classification for the entity. Upon determining a set of classifications for a set of entities (e.g., entities in a column), profile engine 326 may compute a set of metrics ("classification metrics") to disambiguate between the set of classifications. Each of the set of metrics may be computed for a different one of the set of classifications. Profile engine 326 may statistically disambiguate the set of metrics by comparing them to each other to determine which classification most closely represents the set of entities. A classification of the set of entities may be chosen based on the classification that represents the set of entities.

Using the knowledge sources 340, knowledge service 310 can match, in context, the patterns identified by profile engine 326. Knowledge service 310 may compare the identified patterns in the data or the data if in text to entity information for different entities stored by a knowledge source. The entity information may be obtained from one or more knowledge sources 340 using knowledge service 310. Examples of known entity may include social security numbers, telephone numbers, address, proper names, or other personal information. The data may be compared to entity information for different entities to determine if there is a match with one or more entities based on the identified pattern. For example, the knowledge service 310 can match the pattern "XXX-XX-XXXX" to the format of U.S. social security numbers. Furthermore, the knowledge service 310 can determine that social security numbers are protected or sensitive information, the disclosure of which is linked to various penalties.

In some embodiments, profile engine 326 can perform statistical analysis to disambiguate between multiple classifications identified for data processed by profile engine 326. For example, when text is classified with multiple domains, profile engine 326 can process the data to statistically determine the appropriate classification determined by knowledge service 310. The statistical analysis of the classification can be included in the metadata generated by profile engine 326.

In addition to pattern identification, profile engine 326 can analyze data statistically. The profile engine 326 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 326 can be provided to the recommendation engine 308 to generate one or more transform recommendations. The entities that match an identified pattern of the data can be used to enrich the data with those entities identified by classification determined using knowledge service 310. In some embodiments, the data to the identified patterns (e.g., city and state) may be provided to knowledge service 310 to obtain, from a knowledge source 340, entities that match the identified patterns. For example, knowledge service 310 may be invoked calling a routine (e.g., getCities( ) and getStates( )) corresponding to the identified patterns to receive entity information. The information received from knowledge service 310 may include a list (e.g., canonical list) of entities that have properly spelled information (e.g., properly spelled cities and states) for the entities. Entity information corresponding to matching entities obtained from knowledge service 310 can be used to enrich data, e.g., normalize the data, repair the data, and/or augment the data.

In some embodiments, the recommendation engine 308 can generate transform recommendations based on the matched patterns received from the knowledge service 310. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 322 can generate transform scripts based on the recommendations provided by recommendation engine 308 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 322 can automatically generate transform scripts to repair data at the data source. Repairs may include automatically renaming columns, replacing strings or patterns within a column, modifying text case, reformatting data, etc. For example, the transform engine 322 can generate a transformation script to transform a column of dates based on a recommendation from recommendation engine 308 to modify, or convert, the formats of the dates in the column. The recommendation may be selected from multiple recommendations to enrich or modify the data from a data source that is processed by profile engine 326. The recommendation engine 308 may determine the recommendation based on metadata, or profile, provided by the profile engine 326. The metadata may indicate a column of dates identified for different formats (e.g., MM/DD/YYYY, DD-MM-YY, etc.). The transform script generated by transform engine 322 can, for example, split and/or join columns based on suggestions from the recommendation engine 308. The transform engine 322 may also remove columns based on the data source profiles received from profile engine 326 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Examples of recommended transformations are described with reference to FIGS. 4A, 4B, 4C, and 4D. Based on the transform operations specified by a user through the graphical user interface, the transform engine 322 performs transform operations according to those operations. The transform operations may be recommended to the user to enrich a data set.

As described further below, the client's 304 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 330 by publish engine 324. In some embodiments, the data targets can be different data stores than the data sources. In some embodiments, the data targets can be the same data stores as the data sources. Data targets 330 can include a public cloud storage service 332, a private cloud storage service 334, various other cloud services 336, a URL or web-based data target 338, or any other accessible data target.

In some embodiments, recommendation engine 308 can query knowledge service 310 for additional data related to the identified platform. For example, where the data includes a column of city names, related data (e.g., location, state, population, country, etc.) can be identified and a recommendation to enrich the dataset with the related data can be presented. Examples of presenting recommendations and transforming data through a user interface are shown below with respect to FIGS. 4A-4D.

Knowledge service 310 can implement a matching method to compare the data to reference data available through knowledge service 310. Knowledge service 310 can include or have access to one or more knowledge sources 340. The knowledge sources can include publicly available information published by web sites, web services, curated knowledge stores, and other sources. Knowledge service 310 can implement a method to determine the semantic similarity between two or more datasets. This may also be used to match the user's data to reference data available through the knowledge service 310. Knowledge service 310 may perform similarity metric analysis as described in this disclosure. The techniques performed by knowledge service 310 may include those described in this disclosure including the techniques described by the references incorporated herein.

Knowledge service 310 can perform operations to implement automated data analyses. In some embodiments, knowledge service 310 can use an unsupervised machine learning tool, such as a word embedding model (e.g., Word2Vec), to analyze an input data set. A word embedding model can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine a corresponding numeric vector for each input word. When these vectors are analyzed, it may be determined that the vectors are "close" (in the Euclidean sense) within a vector space. This can identify that input words are related (e.g., identifying input words that are clustered closely together within a vector space). Knowledge service 310 may implement operations to categorize the related words using a curated knowledge source 340 (e.g., YAGO, from the Max Planck Institute for Informatics). Using information from a knowledge source 340, knowledge service 310 can add additional, related data to the input data set.

In some embodiments, knowledge service 310 may implement operations to perform trigram modeling to further refine categorization of related terms. Trigram modeling can be used to compare sets of words for category identification. The input data set can be augmented with the related terms.

Using the input data set, which may include added data, knowledge service 310 can implement matching methods (e.g., a graph matching method) to compare the words from the augmented data set to categories of data from knowledge source 340. Knowledge service 310 can implement a method to determine the semantic similarity between the augmented data set and each category in knowledge source 340 to identify a name for the category. The name of the category may be chosen based on a highest similarity metric. The similarity metric may computed be based on the number of terms in the data set that match a category name. The category may be chosen based on the highest number of terms matching based on the similarity metric. Techniques and operations performed for similarity analysis and categorization are further described below.

In some embodiments, knowledge service 310 can augment an input data set and use information from a knowledge source 340 to add additional, related data to the input data set. For example, a data analysis tool such as Word2Vec can be used to identify semantically similar words to those included in the input data set from a knowledge source, such as a text corpus from a news aggregation service. In some embodiments, knowledge service 310 can implement trigram modeling to preprocess data obtained from a knowledge source 340 (such as YAGO) to generate an indexed table of words by category. Knowledge service 310 can then create trigrams for each word in the augmented data set and match the word to a word from the indexed knowledge source 340.

Using the augmented data set (or the trigram matched augmented data set), knowledge service 310 can compare the words from the augmented data set to categories of data from knowledge source 340. For example, each category of data in the knowledge source 340 can be represented as a tree structure, with the root node representing the category, and each leaf node representing a different word belonging to that category. Knowledge service 310 can implement a method (e.g., Jaccard index, or other similarity metric) to determine the semantic similarity between the augmented data set and each category in knowledge source 510. The name of the category that matches the augmented data set (e.g., having a highest similarity metric) can then be applied as a label to the input data set.

In some embodiments, knowledge service 310 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sorensen index; the Tversky index; the Tanimoto metric; and the cosine similarity metric.

In some embodiments, knowledge service 310 may utilize a data analysis tool, such as Word2Vec, to compute a refined metric (e.g., score) that indicates a degree of match between data from a knowledge source 340 and an input data, which may be augmented with data from a knowledge source. The score ("knowledge score") may provide greater knowledge about the degree of similarity between an input data set and a category to which a comparison is made. The knowledge score may enable data enrichment service 302 to choose a category name that bests represents the input data.

In the techniques described above, knowledge service 310 may count the number of matches of terms in the input data set to a candidate category (e.g., genus) name in a knowledge source 340. The result of the comparison may yield a value that represents a whole integer. As such the value, although indicative of the degree of match between terms, may not indicate a degree of match between an input data set and different terms in a knowledge source.

Knowledge service 310 may utilize Word2Vec to determine a similarity of a comparison of each term (e.g., a term for a genus) in a knowledge source and the terms of input data (e.g., species). Using Word2Vec, knowledge service 310 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.5. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, knowledge service 310 can associated "company" instead of "surname" with a user-supplied column of data containing tire manufactures.

Knowledge service 310 can determine information about knowledge groups (e.g., domains or categories). Information about knowledge groups can be presented in a graphical user interface. Information about knowledge domains may include a metric (e.g., a knowledge score) indicating a measure of similarity between a knowledge domain and an input data set of terms. Input data may be compared to data from a knowledge source 340. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, knowledge service 310 may determine a more accurate matching score. The score may correspond to a value computing using a scoring formula using techniques disclosed herein including references that are incorporated herein. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

In some embodiments, user interface 306 can generate one or more graphical visualizations based on metadata provided by profile engine 326. As explained above, the data provided by profile engine 326 may include statistical information indicating metrics about data that has been processed by profile engine 326. Examples of graphical visualizations of metrics of profiled data are shown in FIGS. 7A-7D. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 326 enable the recommendation engine to better focus its queries to knowledge service 310, improving processing speed and reducing load on system resources. For example, this information can be used to limit the scope of knowledge being queried so that the knowledge service 310 does not attempt to match a column of numerical data to place names.

Sentiment analysis engine 344 can process and analyze an input data set. The input data set may be based on a text corpus from a large data source. The input dataset may be obtained from multiple data sources. The datasets may be processed as ingested from data sources, and/or may be processed after processing performed by any elements of data enrichment service 302. Sentiment analysis engine 344 may include one or more components to perform processing on a dataset from a data source to determine semantic analysis using techniques disclosed herein. The sentiment analysis engine 344 will be explained in greater detail with respect to FIG. 12.

Figure 4:
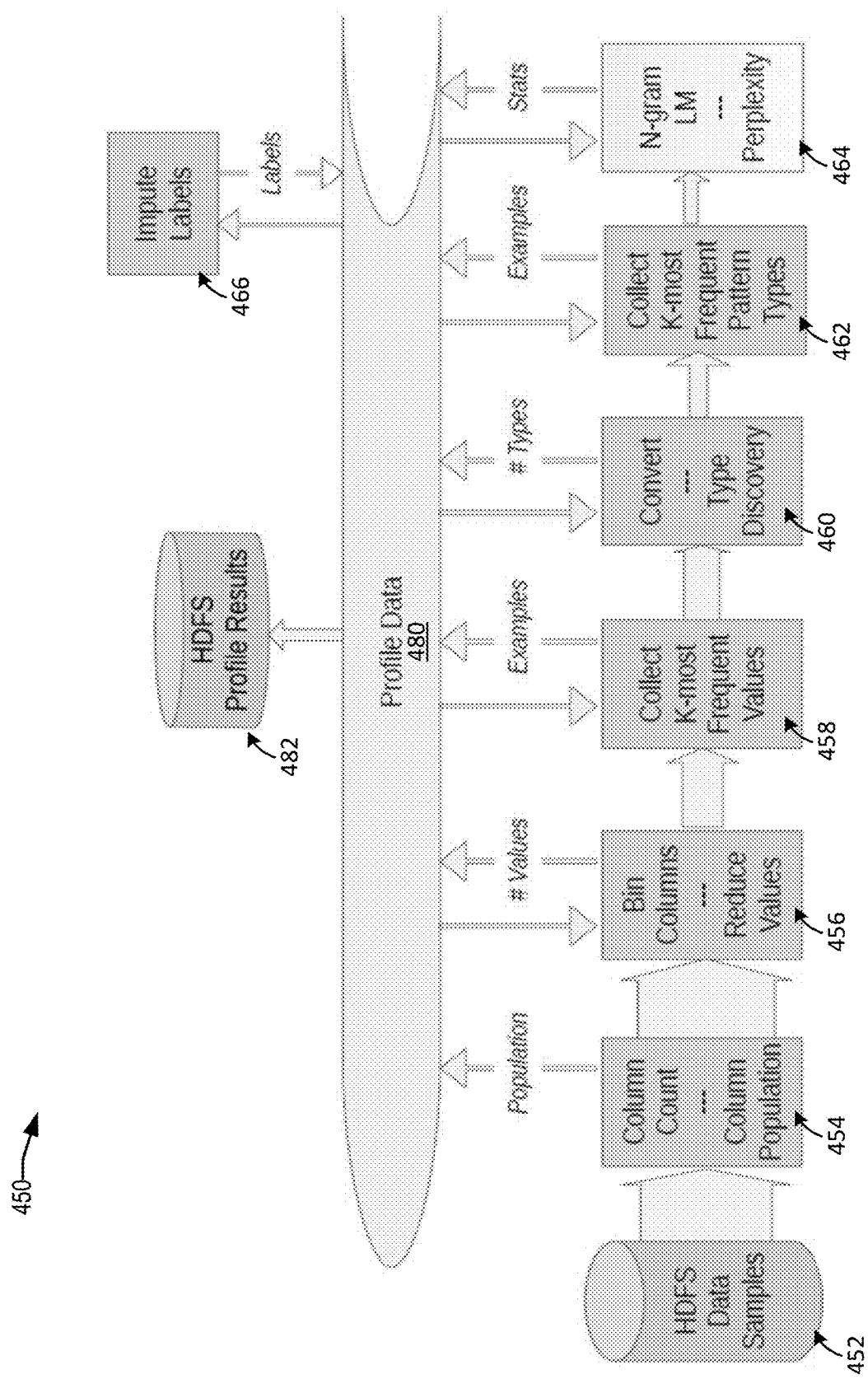
FIG. 4 depicts an example data flow of a profile process of an interactive visualization system, in accordance with some example embodiments.

FIG. 4 depicts an example data flow of a profile process 450 of an interactive visualization system, in according with some example embodiments. Profile process 450 may be implemented by data enrichment service 302. Profile engine 426 may implement all or part of profile process 450 to profile data ingested from various data sources.

Data enrichment service 302 may request data to be processed from data sources. The data sources may be sampled and the sampled data may be stored in a distributed storage system (such as a Hadoop Distributed Storage (HDFS) system) accessible to data enrichment service. In some embodiments, sampled data may be received from one or more data sources. Profile process 450 may analyze sampled data for enrichment, making large data sets more manageable. The data may be processed semantically by a number of processing stages (described herein as a pipeline or semantic pipeline), such as processing stages described with reference to FIGS. 2 and 3.

Profile process 450 may begin at step 452 by accessing sampled data for profiling. Data that is profiled 480 ("profile data") may be generated at one or more steps of process 450. Profile data 480 may be stored in one or more data targets such as a distributed storage system 482. Process 450 may analyze sampled data to determine global statistics including statistics about columns.

At step 454, sampled data may be characterized to determine global statistics, including a column profile. A column profile may indicate column-specific statistics. Examples of column-specific statistics include column count and column population. At step 456, sampled data may be further profiled to determine column values. Column values may be processed to reduce a format of unique values and their frequencies for each column. At step 458, processing may continue to determine column-specific metrics such as a K-most frequent unique values. Examples of K-most frequent values may be stored as profile data 480 in distributed storage system 482. At step 460, type discovery may be performed, whereby unique types are discovered for column data. The number of types may be stored as profile data 480 in distributed storage system 482. At step 462, the unique types may be processed to determine metrics about type patterns, such as K-most frequent patterns types in column data. Examples of the types of patterns may be stored as profile data 380 in distributed storage system 482. At step 464, column data may be further processed to determine n-grams found in columns. Statistics about the N-grams may be stored as profile data 380 in distributed storage system 482. As described herein, profiled data 480 may be used to present data visualizations indicating statistics about large sets of data. At step 466, profiled data may be modified for enrichment to impute labels, such as column names. The labels may be imputed on the basis of the statistics of the profiled data.

With reference to FIG. 4, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, alternative embodiments of the present disclosure may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in the flowchart of FIG. 4 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 5:
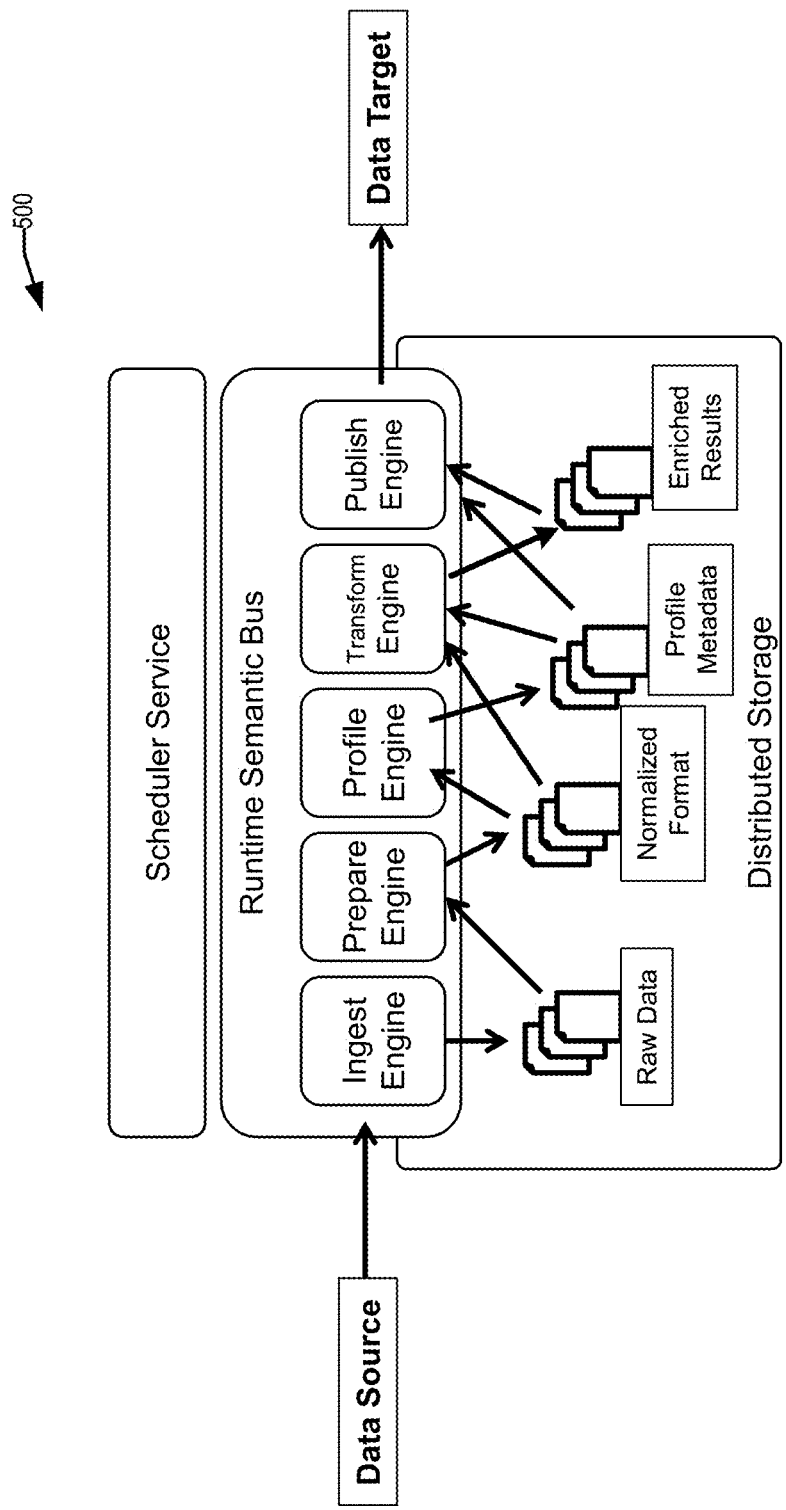
FIG. 5 depicts a simplified block diagram of a data enrichment system, in accordance with some example embodiments.

FIG. 5 depicts a simplified block diagram of a data enrichment system 500, in accordance with some example embodiments. Specifically, data enrichment system 500 may include a semantic processing pipeline, in accordance with some example embodiments. All or part of the semantic processing pipeline may be implemented by data enrichment service 302. As shown in FIG. 5, when a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is further described in this disclosure, such as with reference to FIGS. 4 and 5.

In at least one embodiment, the pipeline may include sentiment analysis engine 344 to perform processes disclosed herein as being performed for determining sentiment of words in data.

Figure 6C:
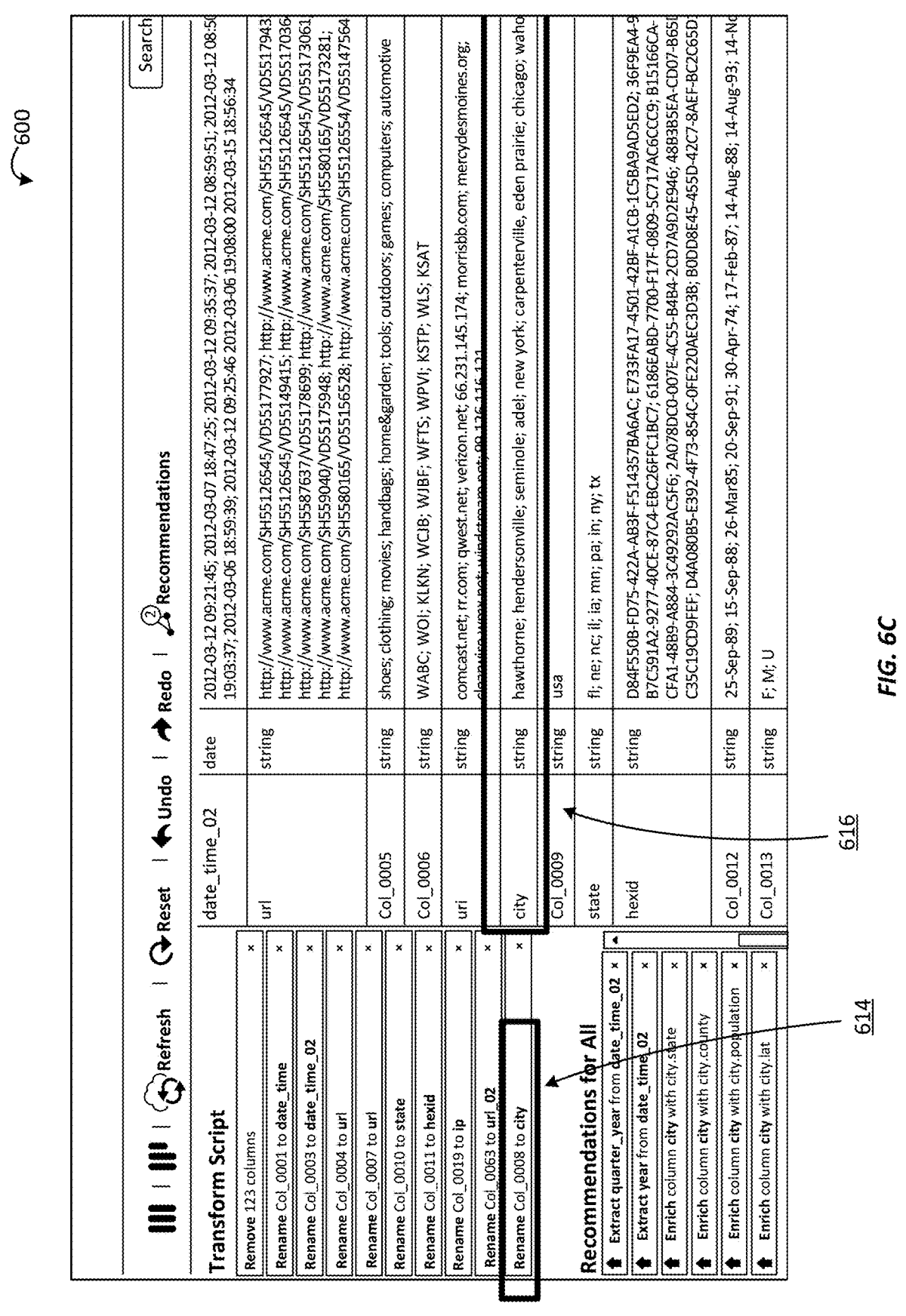

FIGS. 6A-6D depict examples of a user interface that provides interactive data enrichment, in accordance with some example embodiments. As shown in FIG. 6A, an example interactive user interface 600 can display transform scripts 602, recommended transforms 604, and at least a portion of the data 606 being analyzed/transformed. Transform scripts listed in panel 602 can include indicate transforms that have been applied to the data and are visible in panel 606. Each transform script 602 can be written in a simple declarative language intelligible to a business user. Transform scripts listed in panel 602 may be automatically applied to the data and reflected in the portion of the data 606 displayed in the interactive user interface 600. For example, the transform scripts listed in patent 602 include renaming columns to be descriptive of their content. Columns 608 shown in interactive user interface 600 have been renamed according to the transform scripts 602 (e.g., column 0003 is now named date_time_02, column 0007 is no named "url", etc.). Recommended transforms 604, however, have not been automatically applied to the user's data.

As shown in FIG. 6B, a user can view recommendations in recommendation panel 604 and based on the recommendation, identify the data to be changed. For example, recommendation 610 includes a recommendation to rename "Col_0008 to city". Because the recommendation is written such that a business user can understand it (instead of in, e.g., code or pseudo code) the corresponding data 612 can be readily identified by the user. As shown in FIG. 6B, data 612 includes a column of strings (represented as a row in user interface 600). The profile engine 326 can analyze the data to determine that it includes strings of two or fewer words (or tokens). This pattern can be provided to recommendation engine 318 which can query knowledge service 310. In this case, knowledge service 310 has matched the data pattern to city names and recommendation 608 was generated to rename the column accordingly.

In some embodiments, transforms listed in panel 604 may have been applied at the direction of the user (e.g., in response to an instruction to apply the transform) or may have been applied automatically. For example, in some embodiments, knowledge service 310 can provide a confidence score for a given pattern match. A threshold can be set in recommendation engine 318 such that matches having a confidence score greater than the threshold are applied automatically.

To accept the recommendation, the user can select an accept icon 614 (in this example an up arrow icon) associated with the recommendation. As shown in FIG. 6C, this moves the accepted recommendation 614 to transform scripts panel 602 and automatically applies the transform to the corresponding data 616. For example, in the embodiment shown in FIG. 6C, Col_0008 has now been renamed to "city" in accordance with the selected transform.

Figure 6D:
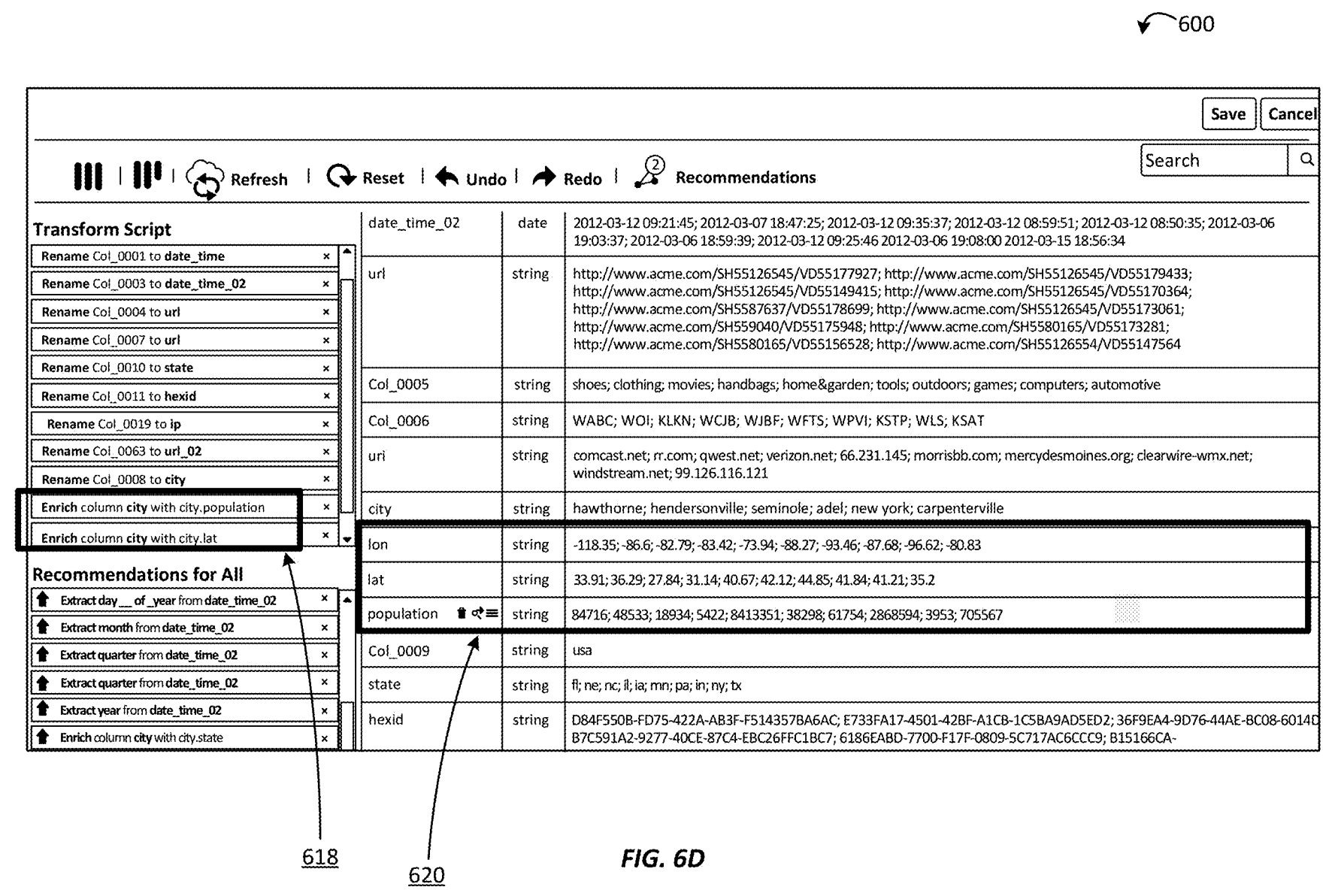

In some embodiments, data enrichment service 302 can recommend additional columns of data to be added to a data source. As shown in FIG. 6D, continuing with the city example, transforms 618 have been accepted to enrich the data with new columns including city population, and city location detail including longitude and latitude. When selected, the user's data set is enriched to include this additional information 620. The data set now includes information that was not previously available to the user in a comprehensive and automated fashion. The user's data set can now be used to produce a nationwide map of locations and population zones associated with other data in the dataset (for example, this may be associated with a company's web site transactions).

Although the example shown in FIGS. 6A-6D illustrates transform scripts, an interactive user interface can be used to perform sentiment analysis.

FIGS. 7A-7D depict examples of various user interfaces that provide visualizations of datasets, in accordance with some example embodiments.

Figure 7A:

FIG. 7A depicts an example of a user interface that provides visualizations of datasets, in accordance with some example embodiments. As shown in FIG. 7A, an example interactive user interface 700 can display a profile summary 702 ("Profile Results"), transform scripts 704, recommended transforms 706, and at least a portion of the data 708 being analyzed/transformed. Transforms listed in panel 704 can include transforms that have been applied to the data and are visible in panel 708.

Profile summary 702 can include global statistics (e.g., total rows and columns) as well as column-specific statistics. The column-specific statistics can be generated from analysis of data processed by data enrichment service 302. In some embodiments, the column-specific statistics can be generated based on column information determined by analysis of data process by data enrichment service 302.

Profile summary 702 may include a map (e.g., "a heat map") of the United States, where different areas of the United States are shown in different colors, based on statistics identified from the data being analyzed 708. The statistics may indicate how frequently those locations are identified as being associated with the data. In one illustrative example, data may represent purchase transactions at an online retailer, where each transaction can be associated with a location (e.g., based on shipping/billing addresses, or based on recorded IP addresses). Profile summary 702 may indicate locations of transactions based on processing of the data representing the purchase transactions. In some embodiments, visualizations can be modified based on user input to assist the user in searching the data and finding useful correlations. These features are described further below.

Figure 7B:
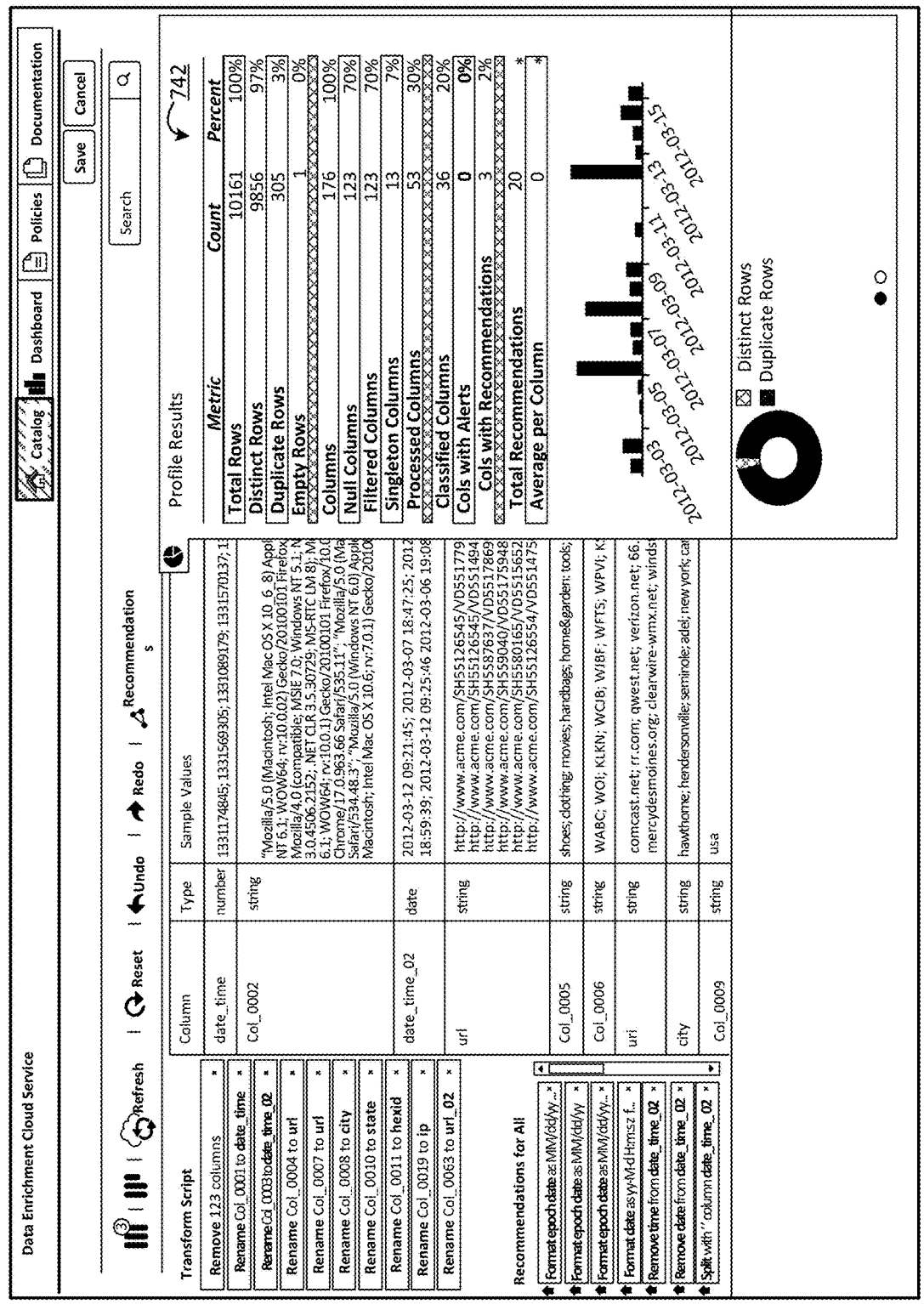
Figure 7C:
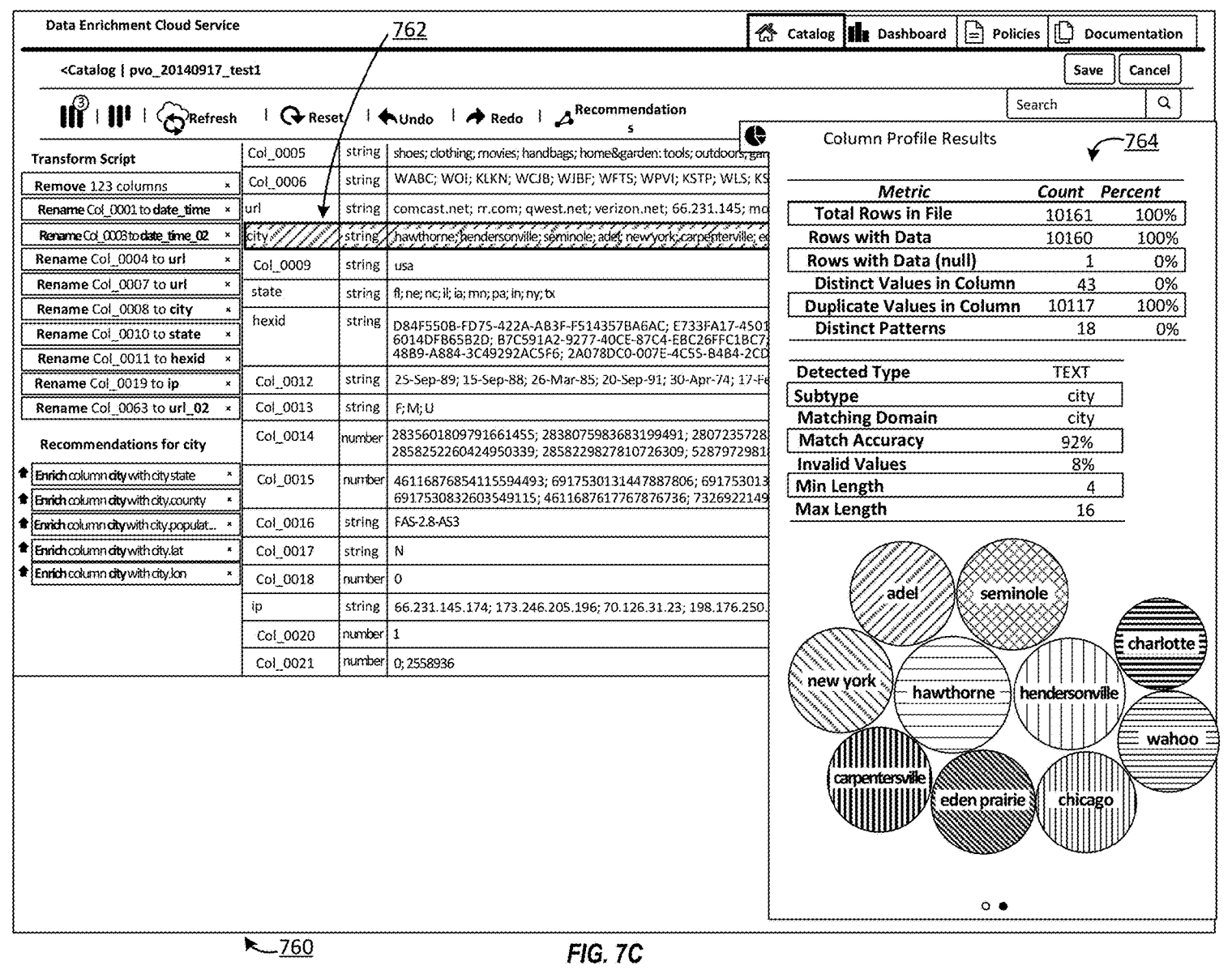
Figure 7D:
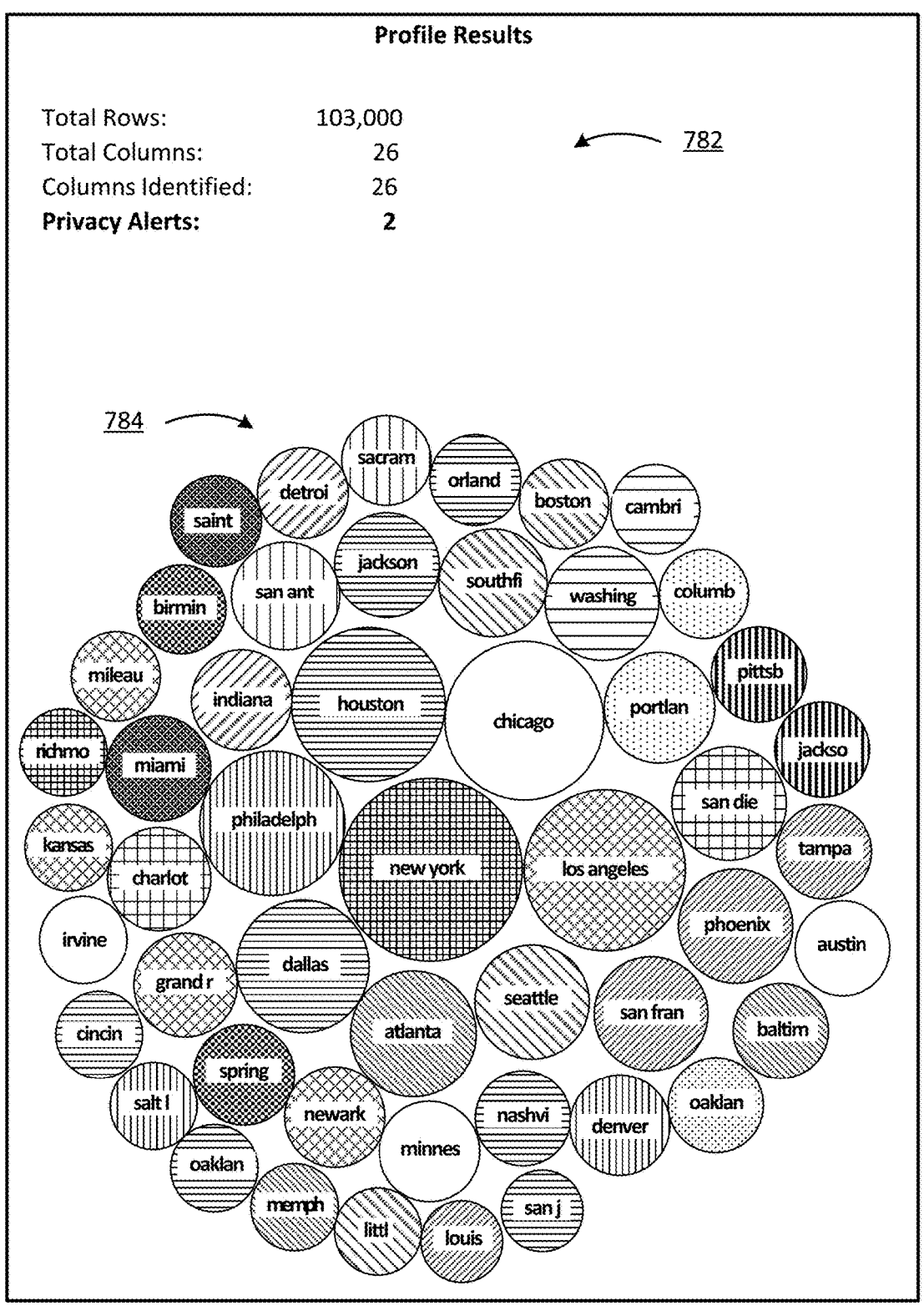

FIGS. 7B, 7C, and 7D show examples of results of interactive data enrichment for data sets. FIG. 7B shows a user interface 740 that can include a profile metric panel 742. Panel 742 can show a summary of metrics associated with the selected data source. In some embodiments, as shown in FIG. 7C, a profile metric panel 760 can include metrics for a particular column 762, instead of an entire data set. For example, the user can select the particular column on the user's client device and the corresponding column profile 764 can be displayed. In this example, the profiler indicates a 92% match of column_0008 with known cities in the knowledge source. A high probability in some embodiments can cause the transform engine to automatically label col_0008 to "city".

FIG. 7D shows a profile metric panel 780 that includes global metrics 782 (e.g., metrics related to an entire dataset), and column-specific visualizations 784. The column specific visualizations 784 can be selected by a user and/or used to navigate the data (e.g., by clicking, dragging, swiping, etc.). The examples described above represent simplified transforms to small data sets. Similar and more complex processing can also be applied automatically to large data sets comprising billions of records.

Sentiment Analysis

Figure 8:
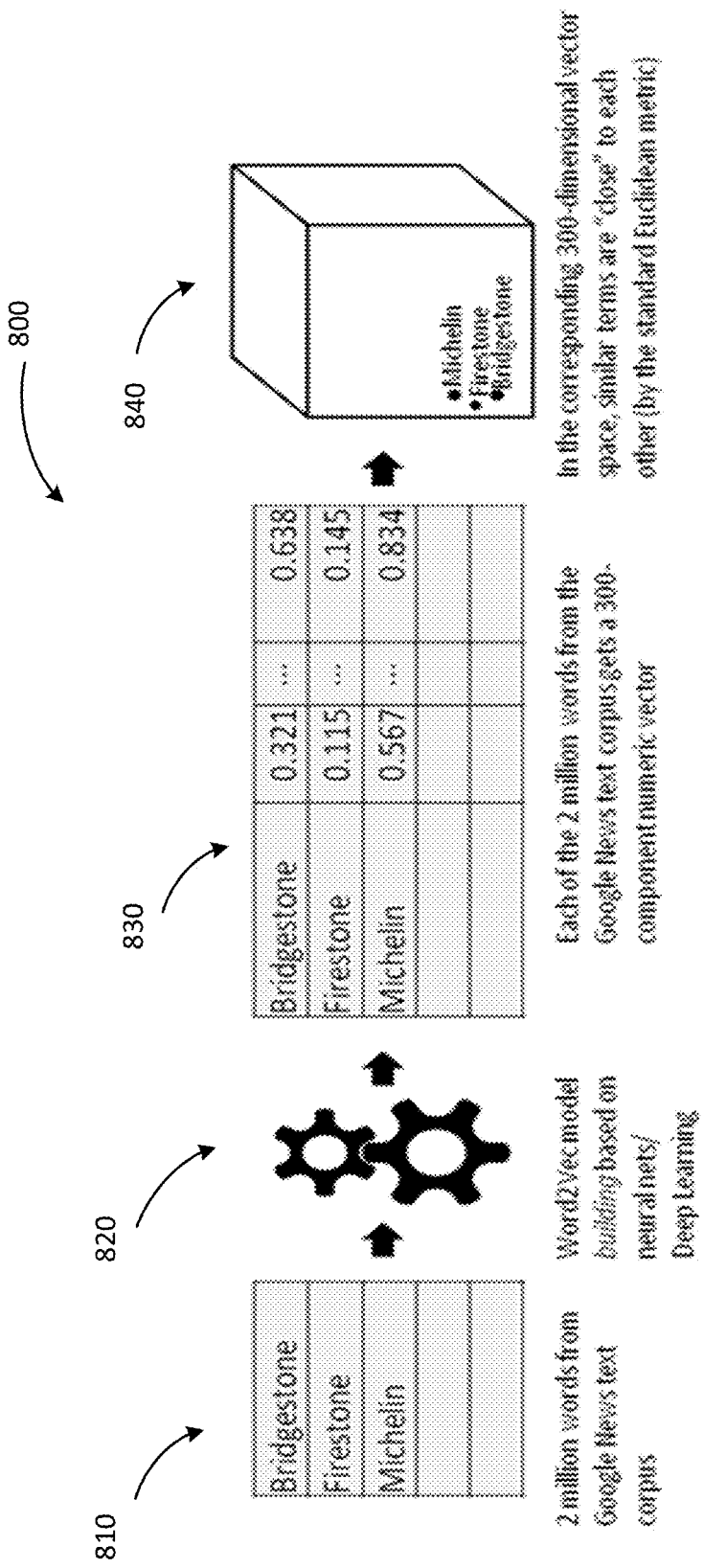
FIG. 8 illustrate a process for performing sentiment analysis, in accordance with some example embodiments.
Figure 9A:
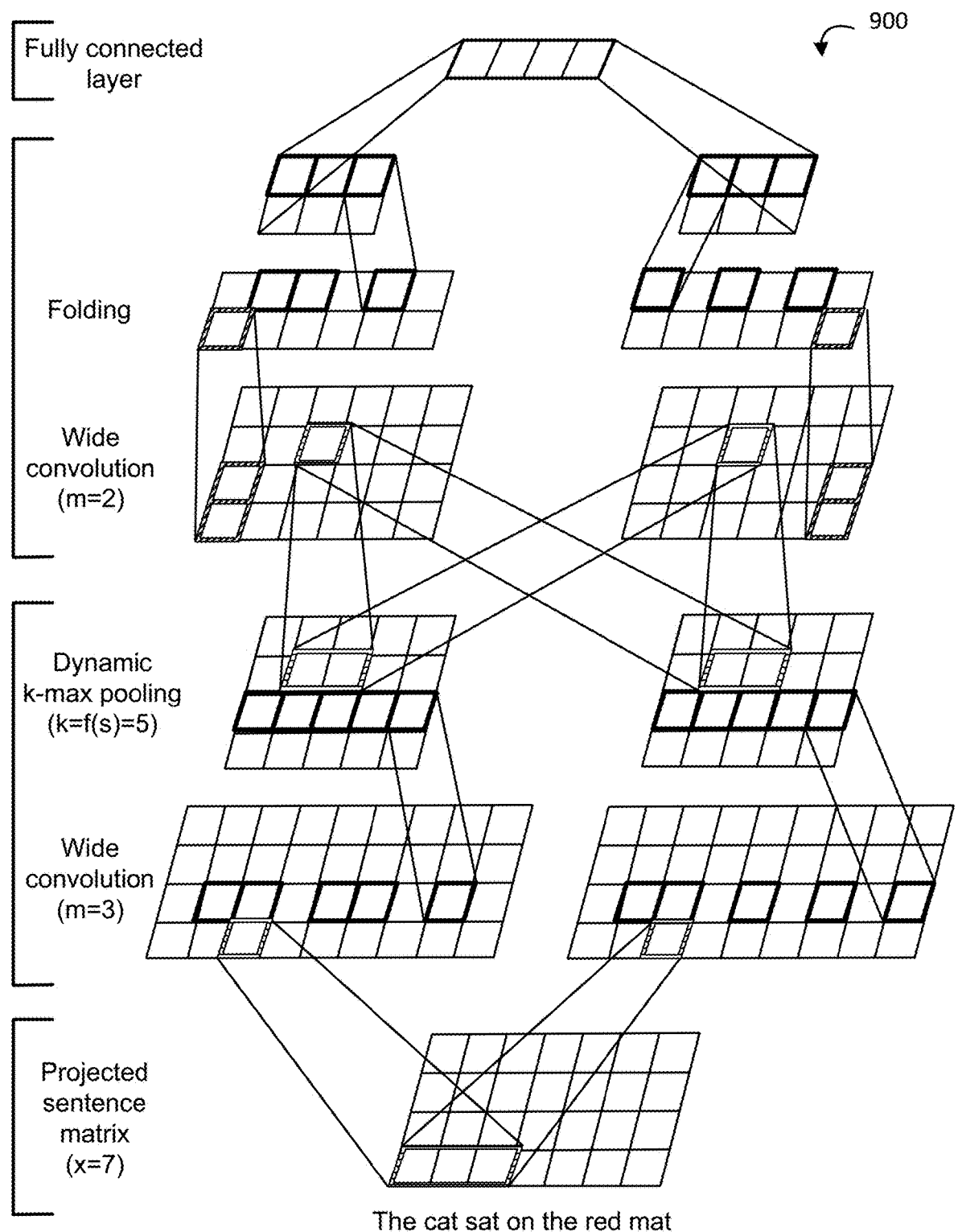
FIG. 9A illustrates an example of a general convolutional neural network (CNN)
Figure 9B:
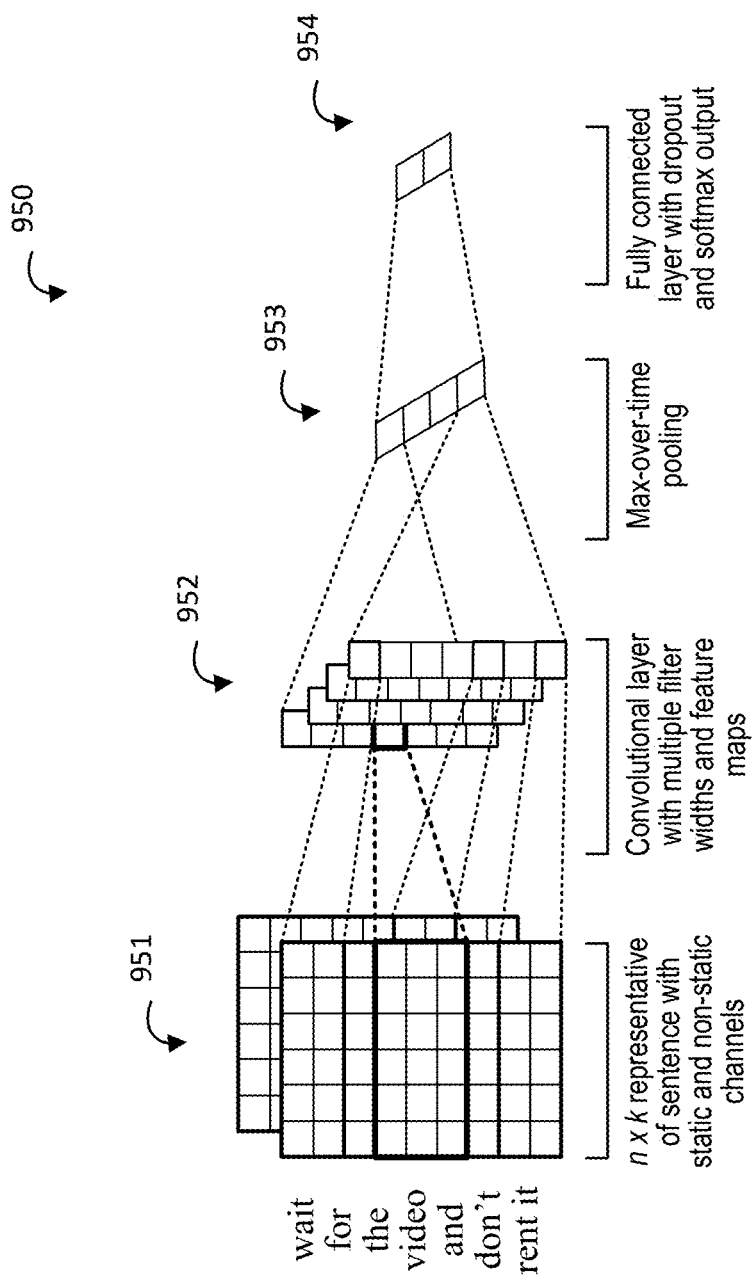
FIG. 9B illustrates a CNN and a word embedding model for performing sentiment analysis, in accordance with some example embodiments.
Figure 10:
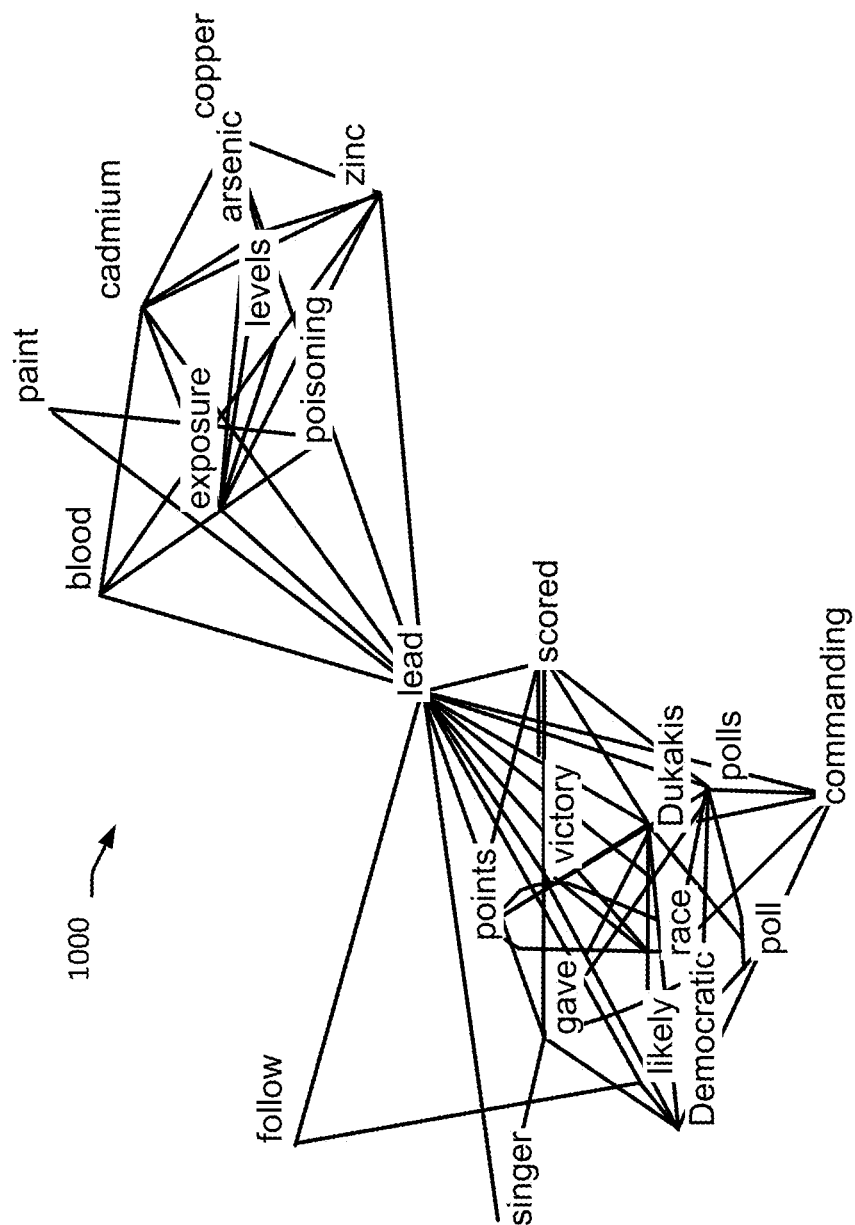
FIG. 10 illustrates a diagram of a co-occurrence graph, in accordance with some example embodiments

FIGS. 8, 9 and 10 illustrate processes implemented as part of some example embodiments. In some embodiments, processes described with reference to FIGS. 8, 9, and 10 can be implemented by a computing system of, for example, the data enrichment service 302.

FIG. 8 illustrate a process 800 for performing sentiment analysis in accordance with some example embodiments. Process 800 may be implemented using programming code, such as Python program code and Scala program code. A more detailed example of sentiment analysis is described with respect to FIGS. 11, 12, 13, 14 and 15.

Process 800 can begin, as shown in FIG. 8, by inputting a data set at step 810. An input set of words can include "Bridgestone", "Firestone", and "Michelin." The input data set may be based on a text corpus from one or more large data sources. The dataset may be obtained from multiple data sources. The dataset may be processed as ingested from data sources, and/or may be processed after processing performed by any elements of data enrichment service 302.

At step 820, the input data set is analyzed. The data can be analyzed by using a machine learning technique, such as Word2Vec, to analyze an input data set. Word2Vec is incorporated by reference for all purposes. Word2Vec may be implemented using techniques disclosed in "Exploiting Similarities among Languages for Machine Translation" (2013), Mikolov et al at http://arxiv.org/pdf/1309.4168.pdf, which is incorporated herein by reference for all purposes. Word2Vec can receive a text input (e.g., a text corpus from a large data source) and generate a data structure (e.g., a vector representation) of each input word as a set of words. The data structure may be referred to herein at a "model" or "Word2Vec model." Although Word2Vec is described, other word embedding models can be used to perform the data analysis.

At step 830, each word in the set of words is associated with a plurality of attributes. The attributes can also be called features, vectors, components, and feature vectors. For example, the data structure may include 300 features associated with each word in the set of words. Features can include, for example, gender, nationality, etc. which describe the words. Each of the features may be determined based on techniques for machine learning (e.g., supervised machine learning) trained based on association with sentiment.

Using the Word2Vec model built using a large text corpus (e.g., a news aggregator, or other data source, such as Google news corpus), a corresponding numeric vector value (e.g., floating point) can be identified for each input word. When these vectors are analyzed, it may be determined that the vectors are "close" (in the Euclidean sense) within a vector space. As shown in step 840, the three input words are clustered closely together within the vector space.

In some embodiments, a Word2Vec model may be generated by a third party provider. The Word2Vec model may be obtained via an application programming interface (API) of the provider. The API may provide functions for obtaining the Word2Vec model including information about the word embedding model, such as the number of components for each word in the model.

A training data set (e.g., movie review tweets) labeled as positive or negative for sentiment may be obtained. For example, the training data set may be obtained from a third party source, such as http://www.cs.cornell.edu/people/pabo/movie-review-data, which is incorporated by reference for all purposes. The training data set may be obtained using an API in conjunction with one or more applications. The sentiment information may be obtained in one or more files through the API. Processing may include stripping out punctuation and formatting the data (e.g., changing the first letter of each word to upper case).

Step 830 may include generating a data structure (e.g., vector data structure) as a two-dimensional matrix based on the training data. Each axis (x-axis and y-axis) in the matrix has coordinates or dimensions. For the training data, one or more applications (e.g., a Lambda application) may be utilized to compute the height of the vector based on the length of a longest text string. For example, the data structure is generated for each message, wherein the height is the maximum number of words in a single review. In constructing the two-dimensional matrix, each row is defined as a word vector and each column can be defined as a feature vector. The data structure is created as input to an API for implementing a convolutional neural network (CNN). The two-dimensional matrix is created such that the y-axis has an entry for each word in a single message, and the x-axis is for the baseline sentiment analysis approach. Each entry or dimension on the x-axis corresponds to a feature of the features in the Word2Vec model. Multiple features can be listed for the word on the x-axis. Each of the features for each word may be obtained from the Word2Vec model generated based on training data.

FIG. 9A illustrates an example of a standard convolutional neural network. A convolutional neural network (CNN) for modeling sentences can use techniques in "A Convolutional Neural Network for Modelling Sentences" (2014) by Kalchbrenner, [http://www.aclweb.org/anthology/P14-1062] which is incorporated by reference for all purposes. The CNN may be implemented as part of process 800. The CNN may be implemented using one-dimensional convolutional layers. The CNN may be implemented using a package or library provided by a third party (e.g., GitHub). The package may be Keras implemented using Python and/or DeepLearning4J for Java and Scala. Further the CNN can be, for example, a three-layer or a seven-layer CNN. These are merely examples, and different CNN's can be used. Further, the CNN may be created independently by the user.

In at least one embodiment, the array with reference to vectors for each message may be used with a CNN technique to determine sentiment analysis. Examples of techniques may be implemented based on those found at: http://www.wildml.com/2015/11/understanding-convolutional-neural-networks-for-nlp/and https://github.com/fchollet/keras/blob/master/examples/imdb_cnn.py/, which are incorporated by reference for all purposes. Values for variables filter length=3, CNNDenseDropout=0.2, dense_dims=20, batch_size=10, nb_epoch=5, validation_split=0.1 may be set for implementing the CNN technique. The CNN may be implemented by performing the following function calls using the data structures generated above. The CNN may be implemented based on the data structures for the words as a one-dimensional structure.

```
modelCNN = Sequential( )
modelCNN.add(Convolution1D(nb_filter=floor(sqrt(width)),
        filter_length=filter_length,
        border_mode='valid',
        activation='relu',
        subsample_length=1,
        input_shape=(height,width)))
modelCNN.add(GlobalMaxPooling1D( ))
modelCNN.add(Dense(dense_dims))
modelCNN.add(Dropout(CNNDenseDropout))
modelCNN.add(Activation('relu'))
modelCNN.add(Dense(1))
modelCNN.add(Activation('sigmoid'))
modelCNN.compile(loss = 'binary_crossentropy',
        optimizer = 'adam',
        metrics = ['accuracy'])
modelCNN.fit (X, Y,
    batch_size = batch_size,
    nb_epoch = nb_epoch,
    validation_split = validation_split,
    verbose = 2)
```

By executing the CNN based on the function calls, the training data is executed for testing using the CNN to perform initial sentiment analysis.

FIG. 9B illustrates a CNN 950 and a word embedding model for performing sentiment analysis, in accordance with some example embodiments. The example shown in FIG. 9B is with respect to an example text from a movie review.

At step 951, a matrix can be generated that is representative of a sentence with static and non-static channels. A non-static channel can include fine tuning the word embedding model vectors and a static channel can include using word embedding model vectors verbatim. A sentence "wait for the video and don't rent it" is stacked vertically. Each of the word embedding model vectors are laid horizontally in order to create a matrix. At step 952, the matrix is run through a CNN. The example CNN is a one-dimensional CNN. The matrix is run through the CNN with multiple filter widths and feature maps.

At step 953, max-over-time pooling or max pooling (e.g., GlobalMaxPoolingID( )) is performed. In the example, GlobalMaxPoolingID( ), the "1" in "1D" refers to a time dimension. At step 954, the output of running the matrix through the CNN is a fully connected layer with dropout and softmax output. Dropout can include deleting some of the nodes ("neurons") in a neural network. By deleting some of the nodes, over-fitting can be prevented. Over-fitting can occur if a machine learning model can accurately predict an output from an input that the machine learning model has been trained on, but may perform poorly on data it was not trained on. Softmax can be used in the final CNN layer to ensure that the output probabilities for all the potential "classes" sum to 1. In sentiment analysis, there can be two classes, such as positive sentiment and negative sentiment. The nodes/neurons in the next-to-last layer in CNN can output any number of any magnitude, and the softmax layer can ensure that the values output from this final layer are in the range of 0 to 1 (indicating probability) and that the sum of the outputs is 1. the output includes two values which indicate positive sentiment or negative sentiment.

Therefore, an example embodiment provides a more powerful technique for performing sentiment analysis by using a combination of a CNN and a word embedding model.

FIG. 10 illustrates a diagram of a co-occurrence graph implemented for process 800 in accordance with some example embodiments. A co-occurrence graph may be implemented using techniques disclosed in "Choosing the Word Most Typical in Context: Using a Lexical Co-occurrence Network" (1997) Philip Edmonds [https://arxiv.org/pdf/cs/9811009.pdf], which is incorporated herein by reference for all purposes. In accordance with some example embodiments, a co-occurrence graph may be generated to identify words having a relationship for purposes of sentiment analysis. The connection of occurrence between words may be used to identify words having a more frequent occurrence for purposes of determining popular bigrams.

Prior to preparing the co-occurrence graph, process 800 may include eliminating some words (e.g., stop words) from the data set. For example, a toolkit such as NLTK stop words from http://www.nltk.org/nltk_data/, may be implemented to remove stop words. The toolkit described at http://www.nltk.org/nltk_data/ is incorporated by reference for all purposes.

A co-occurrence graph (also referred to herein as a "graph") may be generated for process 800. In some embodiments, a co-occurrence graph may be generated based on a graph library. A graph library may be generated using Scala programming code. A co-occurrence graph can identify a relationship between words corresponding to the words in the generated vector. The graph may be generated based on bigrams as word representations. Techniques for Bigrams may be implemented using "A Bigram Extension to Word Vector Representation" (2015) Adrian Sanborn [http://cs229.stanford.edu/proj2014/Adrian%20Sanborn,%20 Jacek%20Skryzalin,%20A%20bigram%20extension%20 to%20word%20vectoo20representation.pdf], which is incorporated by reference for all purposes.

Popular word bigrams are detected using a co-occurrence graph. The detection of the bigrams can be performed during training of the of the bigram generator. The graph may be used to identify bigrams represented in any set of words in each vector. The matrix is updated for the words in the vectors matching the bigrams. Stop words (such as "of") are first eliminated, and a window (e.g. of three words) is used to create the graph. For example, for the sentence "The film was a piece of work", stop words would first be deleted, leaving "film piece work." With a window size of two words, the following edges, each of weight 1, would comprise the co-occurrence graph:

film→piece
film→work
piece→work

If, during training, the words "piece→work" appear again, then the weight for that edge is incremented to 2. After all the training data has been scanned into the co-occurrence graph, the most highly weighted edges are selected and become the highest weighted bigrams. Bigrams having a higher weight can be assigned greater priority than bigrams with a lower weight. A package or an API may be used to generate a data structure of all pairs of words (e.g., hot words) identified based on the graph.

Process 800 includes regenerating the data structure for each of the words in the corpus to be analyzed. A data structure (vector) may be created for each sentence. The vector may include columns populated based on Word2Vec model. The data structure for each word may be modified to add additional fields (e.g., columns) to the y-axis. The two-dimensional matrix is modified to include additional dimensions (e.g., 300 additional dimensions) for new features of a different type than those initially in the matrix.

The techniques disclosed herein can improve the accuracy of performing sentiment analysis. That is, example embodiments provide a more accurate method of determining sentiment from a data set including a plurality of words. During any step of process 800, information may be displayed in a graphical interface to aid a user in understanding processing of messages for sentiment analysis.

Figure 11:
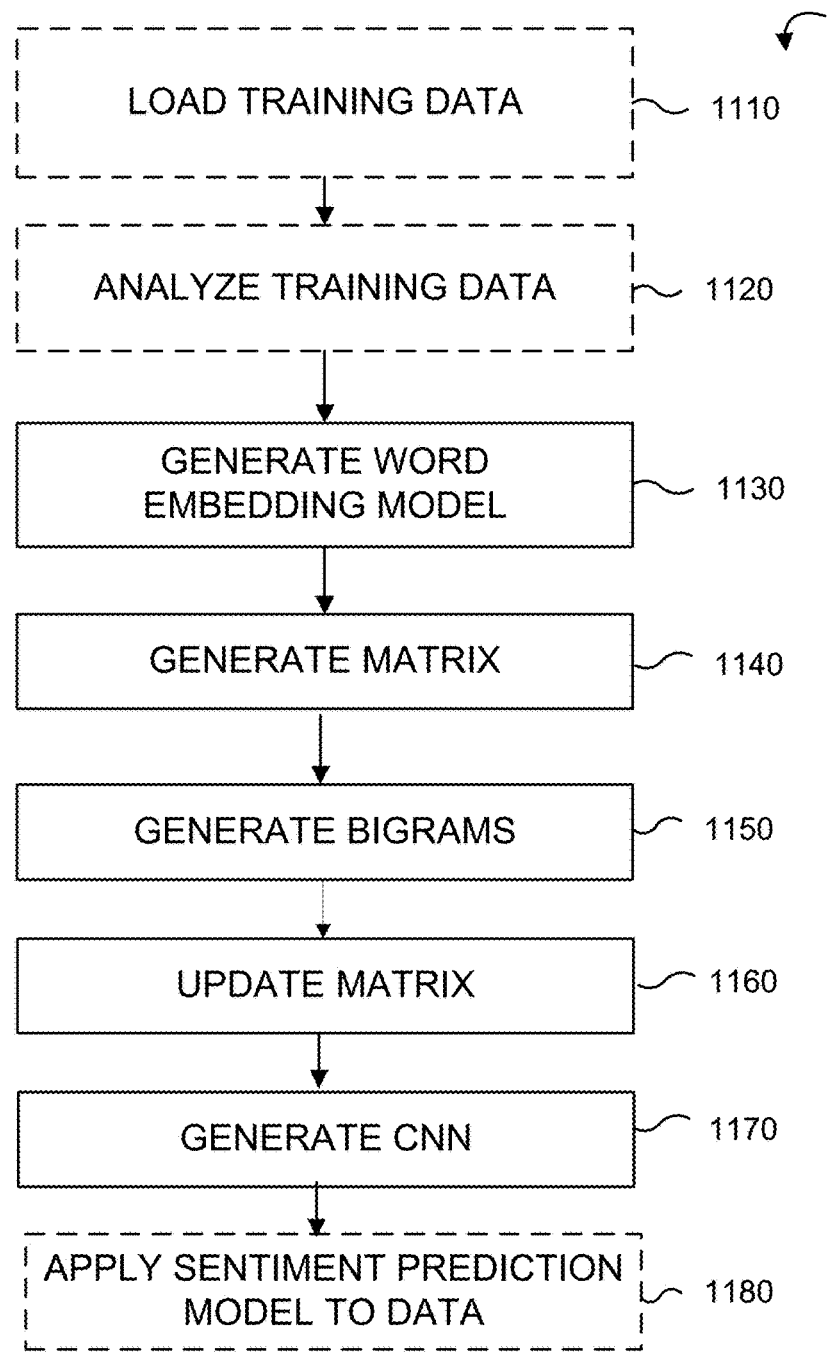
FIG. 11 illustrates a method for performing sentiment analysis, in accordance with some example embodiments.
Figure 12:
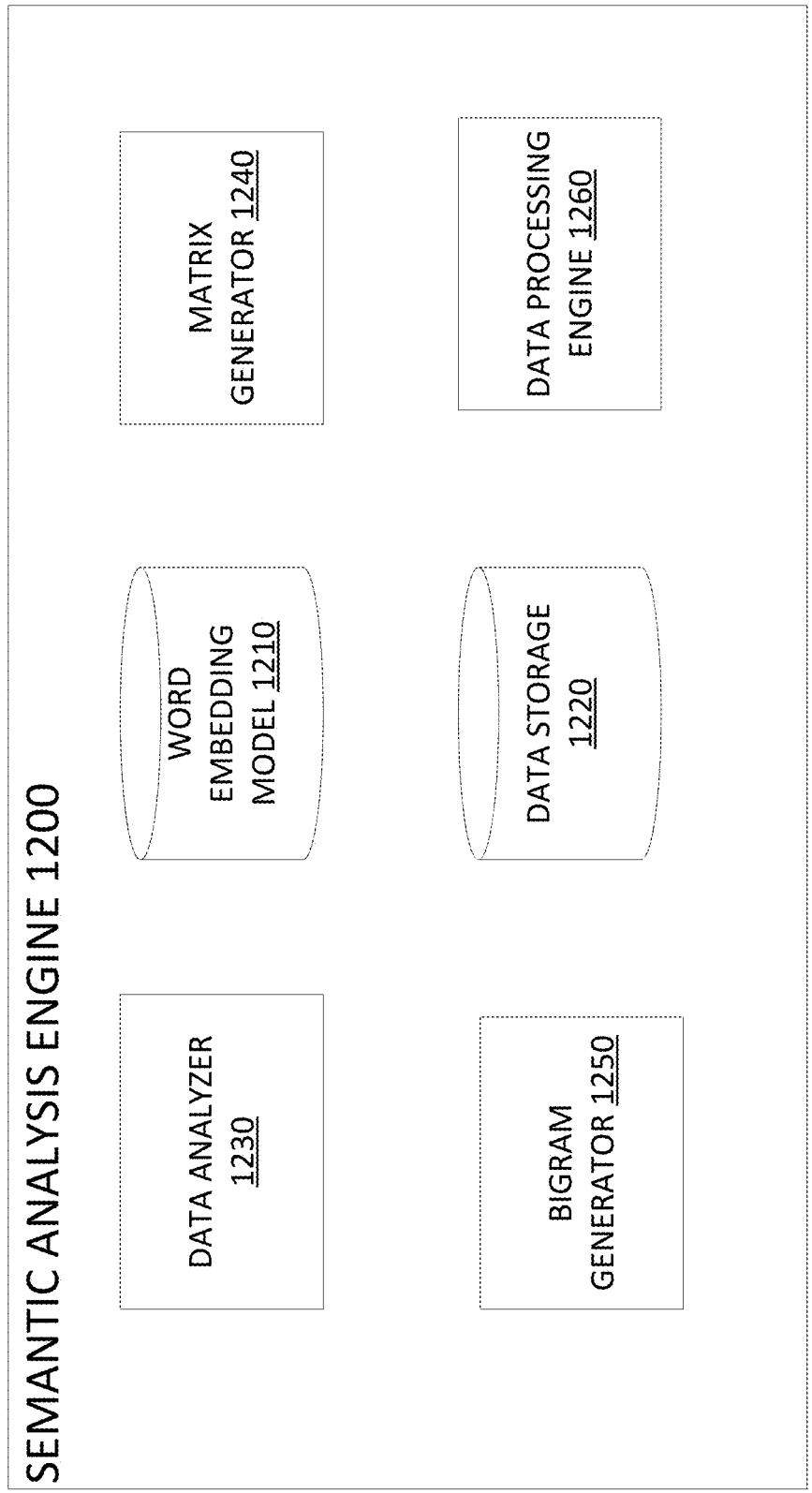
FIG. 12 illustrates a system for performing sentiment analysis, in accordance with some example embodiments.

FIG. 11 illustrates a method 1100 for performing sentiment analysis, in accordance with some example embodiments. FIG. 12 illustrates a sentiment analysis engine 1200 for performing sentiment analysis, in accordance with some example embodiments. The sentiment analysis engine 1200 can correspond to, for example, sentiment analysis engine 344 of FIG. 3.

System 1200 of FIG. 12 can include a word embedding model storage 1210, a data storage 1220, a data analyzer 1230, a matrix generator 1240, a bigram generator 1250, and a data processing engine 1260.

At step 1110, data for training the word embedding model can be loaded. The training data to be used for training the word embedding model can include, for example, a document such as a spreadsheet or table. The training data can include, for example, review information, such as movie reviews, or social media information, such as status posts. The training data can also include, for example, customer information. However, these are merely examples and the training data can correspond to the type of data for which sentiment analysis is to be performed. The data can be obtained from the data storage 1220.

For purposes of an example, the data that is obtained from the data storage can be movie review data. The word embedding model that is stored in the word embedding model storage 1210 and the review data that is stored in the review data storage 1220 can be obtained from an external source, such as from a cloud.

At step 1120, after the training data has been loaded, the training data can be analyzed. Accuracy of the word embedding model is increased if the training data that is used is similar to the data that the user intends to analyze in the future. For example, if the user intends to perform sentiment analysis on movie reviews, the accuracy of the sentiment prediction model would be increased if movie review data or similar data is used to train the model.

The data can be analyzed by data analyzer 1230. For example, the data analyzer 1230 can determine that the longest review among the review data is 51 words. Further, the data can be labeled according to positive and negative reviews. The labels that are assigned to the reviews can be associated with a number. For example, positive reviews can be associated with a value of "1.0" and negative reviews can be associated with a value of "0.0." The reviews are associated with numbers in order for machine learning to be performed with the reviews. Machine learning can be performed with the reviews and it can be determined that positive reviews are associated with a value of "1.0" and negative reviews can be associated with a value of "0.0." This is merely an example, and other example of machine learning can be performed with data. However, in order to expedite the machine learning processing, data, such as text data, are associated with numerical values.

Loading the training data can be optional since a user may use a word embedding model that has been previously trained. Therefore, the user may use a pre-trained word embedding model therefore, the loading of the training data and the analyzing of the data does not need to be performed.

At step 1130, a word embedding model is generated and loaded to a data processing engine. The word embedding model can be obtained from the word embedding model storage 1210. The data processing engine can correspond to data processing engine 1260. The word embedding model that is stored in the word embedding model storage 1210 can be obtained from an external source, such as from a cloud. A data processing engine can be an engine that is used to process large amount of data and is configured for big data processing.

A word embedding model can take a corpus of words and create a vector space for the words. An example of a word embedding model can include Word2Vec. The word embedding model can be an existing word embedding model that is pre-trained, or the word embedding model can be trained by the user so that the word embedding model can be more consistent with the user's data. The word embedding model can be trained using the loaded and analyzed training data from steps 1110 and 1120. The word embedding model can be trained in accordance with the corpus of data to be reviewed. The accuracy of the sentiment analysis can be improved if the word embedding model is trained specifically for the user's data.

The word embedding model can be loaded at the time that the user desires to perform sentiment analysis on data, or the word embedding model can be loaded prior to the data enrichment system prior to performing sentiment analysis.

The word embedding model can include, for example, 300 columns. In the example described, 300 columns of data is used to reflect the relevant dimensions in the human intellect and/or human language. Although in an example, 300 columns are used in the word embedding model, more or fewer columns of data can be used in the word embedding model based on the results desired by the user. The 300 columns of data can be associated with floating-point numbers which are a numerical representation of the words in relation to the features.

At step 1140, a matrix is generated. An example matrix is shown in greater detail with respect to FIG. 13. FIG. 13 illustrates a matrix, in accordance with some example embodiments. A matrix can be generated by the matrix generator 1240.

As shown in FIG. 13, the matrix 1300 includes words 1310 that are used for training the word embedding model. The words are stacked vertically and the word embedding model vectors are laid out horizontally. In the example shown in FIG. 13, the words 1310 used for training are text from a review which recites "The film is a piece of work." Each word in the review appears in a separate row in the matrix. The number of rows would correspond to the numbers of words in the review. The matrix 1300 also includes the word embedding model vectors 1320. The vectors 1320 can also be called features, components, attributes and feature vectors. The features represent properties or characteristics of the data being analyzed.

In the example shown in FIG. 13, 300 vectors are used. There is a floating point number 1340 corresponding to each word and vector. For example, the word "The" and a first vector (1 of 300) can have a floating point of "0.3". The word "The" and a second vector (2 of 300) can have a floating point of "0.5." Although 300 vectors are used, this is merely an example and more or fewer vectors can be used depending on the results desired by the user.

At the end of step 1140, the word embedding model can be tested and trained to determine the accuracy of the word embedding model. An accuracy score can be calculated for each epoch. An epoch is the cycle in which all of the training data is run through the word embedding model. If, for example, the user is satisfied with the score of the model after running an epoch, then the user can proceed with implementing the word embedding model on the data set for which the user would like to perform sentiment analysis. However, if the user is not satisfied with score provided by the word embedding model, then the user can continue to refine the word embedding model.

After the matrix has been generated, a convolutional neural network can be generated and applied to the 300 columns of word embedding model vectors. However, applying a CNN to the 300 columns of the word embedding model vectors may not provide highly accurate sentiment analysis. The accuracy of the sentiment prediction model can be improved if the sentiment prediction model is modified to include additional vectors or features to apply to the data set.

However, merely adding additional features based on single words in data set may not improve the accuracy of the model. Specifically, single words can be associated with a different meaning than words in combination. For example, "piece" and "work" as individual words can be associated with a different meaning than "piece of work." "Piece of work" can be associated with a negative sentiment, whereas "piece" and "work" individually can be associated with positive sentiment. Alternatively, individual words may not be associated with any sentiment, whereas a combination of words can be associated with a positive or negative sentiment. Therefore, adding additional features to the matrix based on bigrams instead of single words improves the accuracy of the model.

At step 1150, bigrams are determined in accordance with a co-occurrence graph. A bigram can be determined by bigram generator 1250.

In accordance with some example embodiments, bigrams are generated and a CNN is applied to 600 columns of feature vectors. In the example described, 300 columns of word embedding model vectors are used, however, the number of word embedding model vectors can be more or less than 300. Further, in the example described, 300 columns of bigram vectors are used, however, the number of bigram vectors can be more or less than 300. Further, the number of bigram vectors used can be different (e.g., more or less) than the number of word embedding model vectors that are used. A number of columns of vectors can be a machine learning model hyperparameter and a machine learning model can be modified based on one or more hyperparameter values. The complexity of the language being analyzed can influence how many columns of feature vectors should be used for the word embedding model vectors and the bigram vectors.

The combination of a matrix of feature vectors and a CNN that is applied to feature vectors can be a sentiment prediction model in accordance with some example embodiments. The matrix of feature vectors uses a combination of single word features and bigram features.

Figure 14:
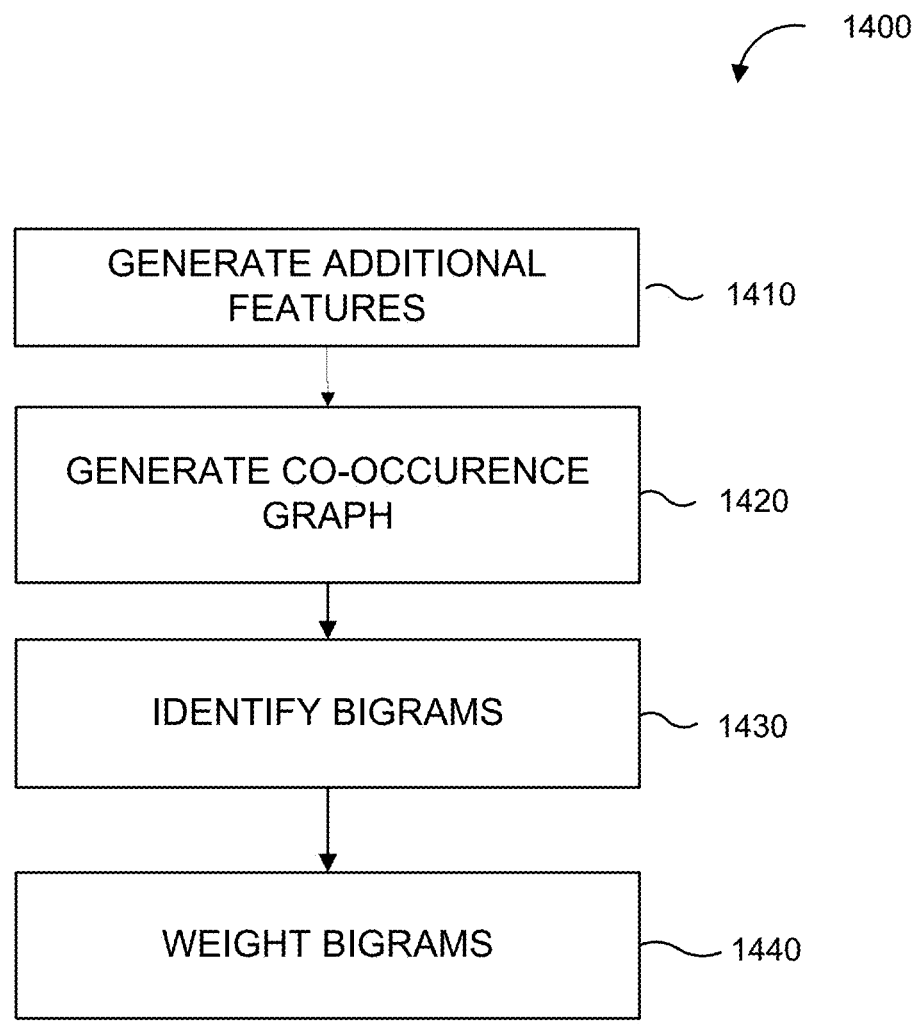
FIG. 14 illustrates a method of generating bigram vectors, in accordance with some example embodiments

FIG. 14 illustrates a method 1400 for generating bigrams, in accordance with some example embodiments. Step 1150 of FIG. 11 can include steps 1410-1440 of FIG. 14.

At step 1410, additional features can be identified. For example, 300 additional features can be identified that correspond to "hot phrases." Common words such as "to," "of," "a," "an," "and," etc. can be skipped in order to increase the accuracy of the sentiment prediction model.

At step 1420, a co-occurrence graph is generated. A co-occurrence graph may be generated to identify words having a relationship for purposes of sentiment analysis. The connection of occurrence between words may be used to identify words having a more frequent occurrence for purposes of determining popular bigram.

At step 1430, bigrams are identified using the co-occurrence graph. The bigrams correspond to hot phrases which include two or more words. In the example described, the hot phrases include two words and are therefore referred to as bigrams or pairs of words. The additional features are based on "hot phrases" that are identified from the training data. For example, a hot phrase can include "piece work" and a second hot phrase can include "great film." The features can correspond to, for example, gender, location, age, or other attributes that describe the data.

The features that are determined in step 1430 are different from the features that are identified for the matrix that is generated at step 1140. The features that are determined at step 1140 are based on single words, whereas the features that are determined at step 1430 are based on hot phrases which include more than one word. Therefore, the features that are determined at step 1430 will be different from the features that are initially determined for step 1140. However, there can be some overlap in the features that are identified. For example, a feature that is identified for the single words may also be identified for the bigrams. Further, although in the example, the hot phrases include two words, more than two words can be used to determine additional features. For example, trigrams can be used to determine additional features, or a combination of bigrams and trigrams can be used.

At step 1440, the bigrams are weighted. The bigrams or pair of words that appear most often are weighted more than the bigrams that appear less often.

Therefore, additional features that the features that were initially generated in the matrix can be created. In the example embodiment, 300 additional features are obtained and can be added to the matrix. The 300 additional features are determined based on the most highly weighted bigrams.

Returning back to FIG. 11, after the bigrams are generated, at step 1160, the matrix that was generated in step 1140 is expanded to include the bigram information that was determined in step 1150. Therefore, at step 1160, the matrix is updated to include the bigram vectors.

As shown in FIG. 15, the matrix 1500 includes the word embedding vectors 1520 and the bigram vectors 1530. The word embedding vectors 1520 correspond to the word embedding vectors 1320 of FIG. 13. However, FIG. 15 includes an additional 300 columns of bigram vectors 1530.

The additional features may correspond to the hot words identified based on the matrix. The bigrams may be assigned a bigram value or score 1540. Those features may have a value of a 1.0 or 0.0 indicating whether that word (from the y-axis of the two-dimensional matrix for a message) participates in a popular bigram. With respect to the additional features, where words are identified as being part of a bigram based on the hot words, the vector in a sentence may be updated to store a value of 1 to indicate those words with respect to the columns where words are part of a bigram. Processing may include storing an intermediate pair of each two words identified in hot words. Each pair of words identified in hot words are then compared in a sorted order to the bigrams of hot words to identify possible hot words. A value of 0 may be stored where words are not part of a bigram. Based on the processing, the vector for each sentence can be used to assess sentiment analysis including words that are part of a bigram.

At step 1180, the sentiment prediction model which now includes the matrix of 600 feature vectors can be applied to a new data set in order to determine sentiment from the words. After the sentiment prediction model has been trained, the user can now use the sentiment prediction model to perform sentiment analysis on data. For example, a sentiment prediction model can be used to determine sentiment in future reviews and can determine, for example, whether reviews are positive or negative.

Therefore, an example embodiment provides an efficient method of determining sentiment from a large group of data, such as movie reviews. Example embodiments provide increased accuracy in sentiment analysis since additional machine learning features are added. Specifically, the addition of new features based on common bigrams increases the accuracy of the sentiment prediction model. Although the example is described with respect to movie reviews, example embodiments can be applied to any words in order to determine sentiment.

Computer System

Figure 16:
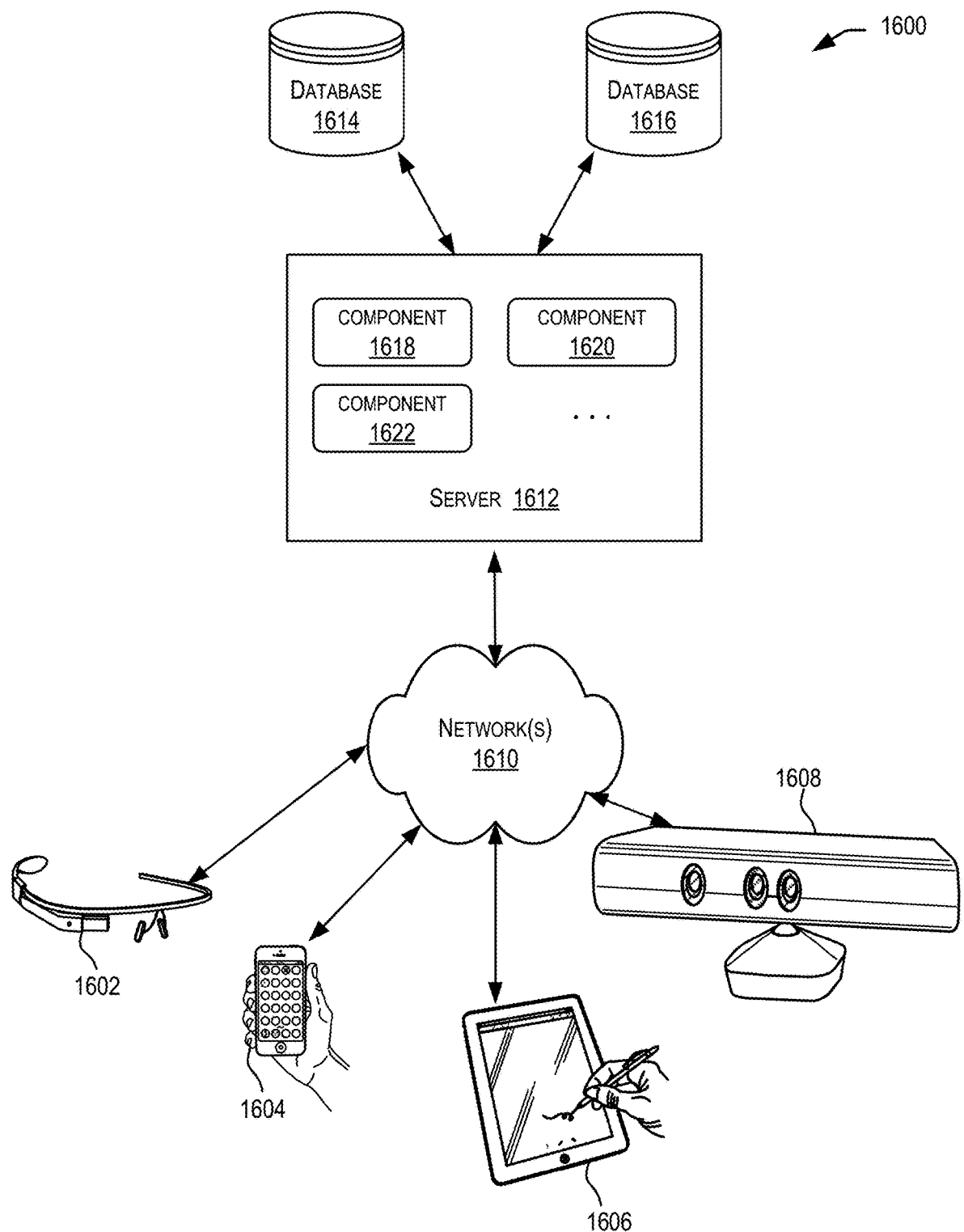
FIG. 16 depicts a simplified diagram of a distributed system, in accordance with some example embodiments.

FIG. 16 depicts a simplified diagram of a distributed system 1600 for implementing an embodiment. In the illustrated embodiment, distributed system 1600 includes one or more client computing devices 1602, 1604, 1606, and 1608, which are configured to execute and operate a client application such as a web browser, proprietary client (e.g., Oracle Forms), or the like over one or more network(s) 1610. Server 1612 may be communicatively coupled with remote client computing devices 1602, 1604, 1606, and 1608 via network 1610.

In various embodiments, server 1612 may be adapted to run one or more services or software applications. In certain embodiments, server 1612 may also provide other services or software applications can include non-virtual and virtual environments. In some embodiments, these services may be offered as web-based or cloud services or under a Software as a Service (SaaS) model to the users of client computing devices 1602, 1604, 1606, and/or 1608. Users operating client computing devices 1602, 1604, 1606, and/or 1608 may in turn utilize one or more client applications to interact with server 1612 to utilize the services provided by these components.

In the configuration depicted in FIG. 16, software components 1618, 1620 and 1622 of system 1600 are shown as being implemented on server 1612. In other embodiments, one or more of the components of system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in FIG. 16 is thus one example of a distributed system for implementing an embodiment system and is not intended to be limiting.

Client computing devices 1602, 1604, 1606, and/or 1608 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1610.

Although distributed system 1600 in FIG. 16 is shown with four client computing devices, any number of client computing devices may be supported. Other devices, such as devices with sensors, etc., may interact with server 1612.

Network(s) 1610 in distributed system 1600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1612 can include one or more virtual machines running virtual operating systems, or other computing architectures involving virtualization. One or more flexible pools of logical storage devices can be virtualized to maintain virtual storage devices for the server. Virtual networks can be controlled by server 1612 using software defined networking. In various embodiments, server 1612 may be adapted to run one or more services or software applications described in the foregoing disclosure. For example, server 1612 may correspond to a server for performing processing as described above according to some example embodiments.

Server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1612 may include one or more applications to analyze and consolidate data feeds and/or event updates received from users of client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1612 may also include one or more applications to display the data feeds and/or real-time events via one or more display devices of client computing devices 1602, 1604, 1606, and 1608.

Distributed system 1600 may also include one or more databases 1614 and 1616. These databases may provide a mechanism for storing information such as user interactions information, usage patterns information, adaptation rules information, and other information used by some of the example embodiments. Databases 1614 and 1616 may reside in a variety of locations. By way of example, one or more of databases 1614 and 1616 may reside on a non-transitory storage medium local to (and/or resident in) server 1612. Alternatively, databases 1614 and 1616 may be remote from server 1612 and in communication with server 1612 via a network-based or dedicated connection. In one set of embodiments, databases 1614 and 1616 may reside in a storage-area network (SAN). Similarly, any necessary files for performing the functions attributed to server 1612 may be stored locally on server 1612 and/or remotely, as appropriate. In one set of embodiments, databases 1614 and 1616 may include relational databases, such as databases provided by Oracle that are adapted to store, update, and retrieve data in response to SQL-formatted commands.

Figure 17:
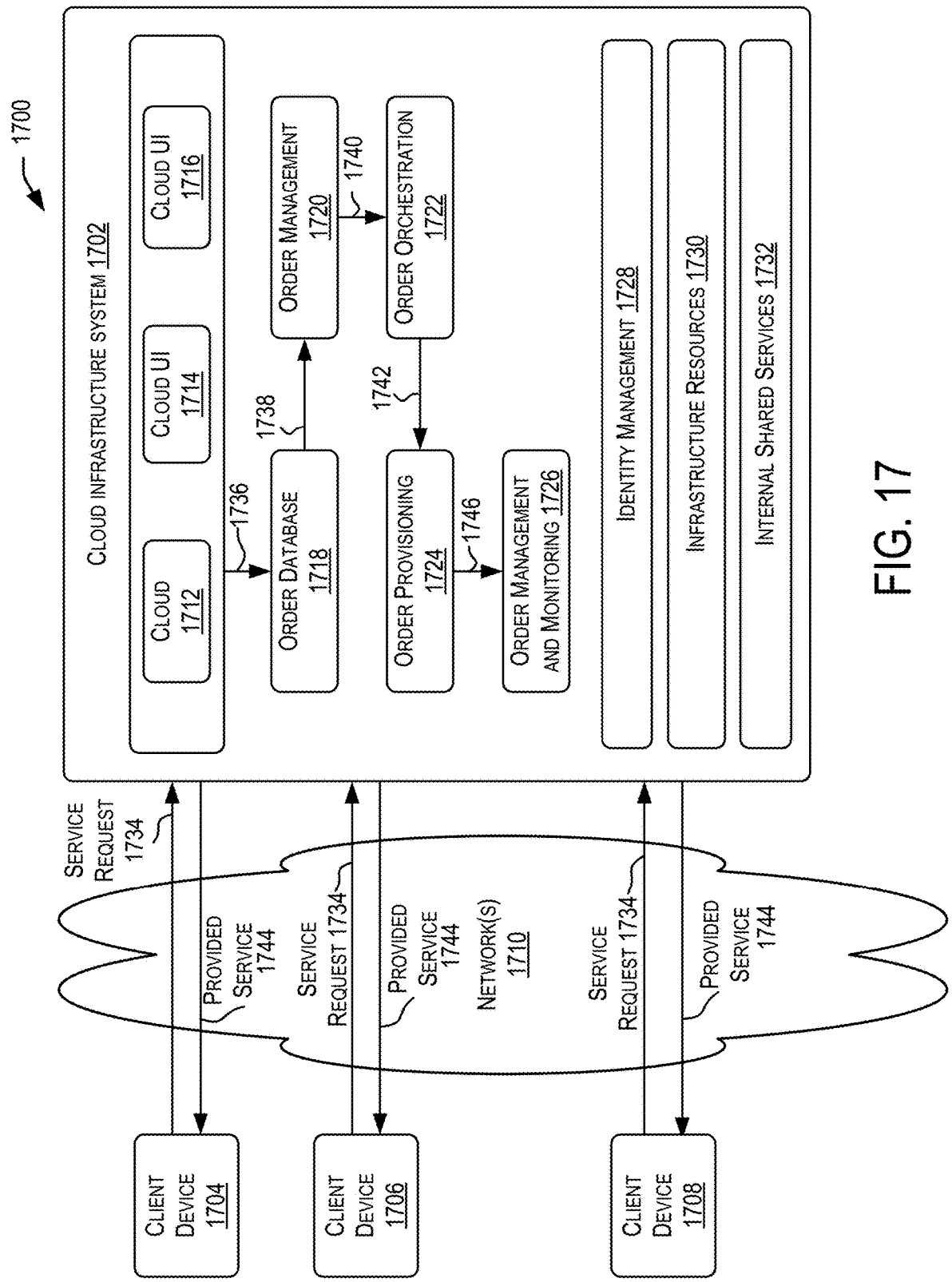
FIG. 17 illustrates a simplified block diagram of one or more components of a system environment in which services may be offered as cloud services, in accordance with some example embodiments.

In some embodiments, a cloud environment may provide one or more service. FIG. 17 is a simplified block diagram of one or more components of a system environment 1700 in which services may be offered as cloud services, in accordance with some example embodiments. In the illustrated embodiment in FIG. 17, system environment 1700 includes one or more client computing devices 1704, 1706, and 1708 that may be used by users to interact with a cloud infrastructure system 1702 that provides cloud services. Cloud infrastructure system 1702 may comprise one or more computers and/or servers that may include those described above for server 1612.

It should be appreciated that cloud infrastructure system 1702 depicted in FIG. 17 may have other components than those depicted. Further, the embodiment shown in FIG. 17 is only one example of a cloud infrastructure system that may incorporate some example embodiments. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for client computing devices 1602, 1604, 1606, and 1608. Client computing devices 1704, 1706, and 1708 may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702. Although exemplary system environment 1700 is shown with three client computing devices, any number of client computing devices may be supported. Other devices such as devices with sensors, etc. may interact with cloud infrastructure system 1702.

Network(s) 1710 may facilitate communications and exchange of data between client computing devices 1704, 1706, and 1708 and cloud infrastructure system 1702. Each network may be any type of network familiar to those skilled in the art that can support data communications using any of a variety of commercially-available protocols, including those described above for network(s) 1610.

In certain embodiments, services provided by cloud infrastructure system 1702 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle Corporation) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform, and other resources.

In some embodiments, resources in cloud infrastructure system 1702 may be shared by multiple users and dynamically re-allocated per demand. Additionally, resources may be allocated to users in different time zones. For example, cloud infrastructure system 1702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 to enable provision of services by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in FIG. 17, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In an exemplary operation, at step 1734, a customer using a client device, such as client computing devices 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI) such as cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

At step 1736, the order information received from the customer may be stored in an order database 1718. If this is a new order, a new record may be created for the order. In one embodiment, order database 1718 can be one of several databases operated by cloud infrastructure system 1718 and operated in conjunction with other system elements.

At step 1738, the order information may be forwarded to an order management module 1720 that may be configured to perform billing and accounting functions related to the order, such as verifying the order, and upon verification, booking the order.

At step 1740, information regarding the order may be communicated to an order orchestration module 1722 that is configured to orchestrate the provisioning of services and resources for the order placed by the customer. In some instances, order orchestration module 1722 may use the services of order provisioning module 1724 for the provisioning. In certain embodiments, order orchestration module 1722 enables the management of business processes associated with each order and applies business logic to determine whether an order should proceed to provisioning.

As shown in the embodiment depicted in FIG. 17, at step 1742, upon receiving an order for a new subscription, order orchestration module 1722 sends a request to order provisioning module 1724 to allocate resources and configure resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. This enables order orchestration module 1722 to be isolated from implementation details, such as whether or not services and resources are actually provisioned on the fly or pre-provisioned and only allocated/assigned upon request.

At step 1744, once the services and resources are provisioned, a notification may be sent to the subscribing customers indicating that the requested service is now ready for use. In some instance, information (e.g. a link) may be sent to the customer that enables the customer to start using the requested services.

At step 1746, a customer's subscription order may be managed and tracked by an order management and monitoring module 1726. In some instances, order management and monitoring module 1726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1700 may include an identity management module 1728 that is configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.). Identity management module 1728 may also include the management of descriptive information about each customer and about how and by whom that descriptive information can be accessed and modified.

Figure 18:
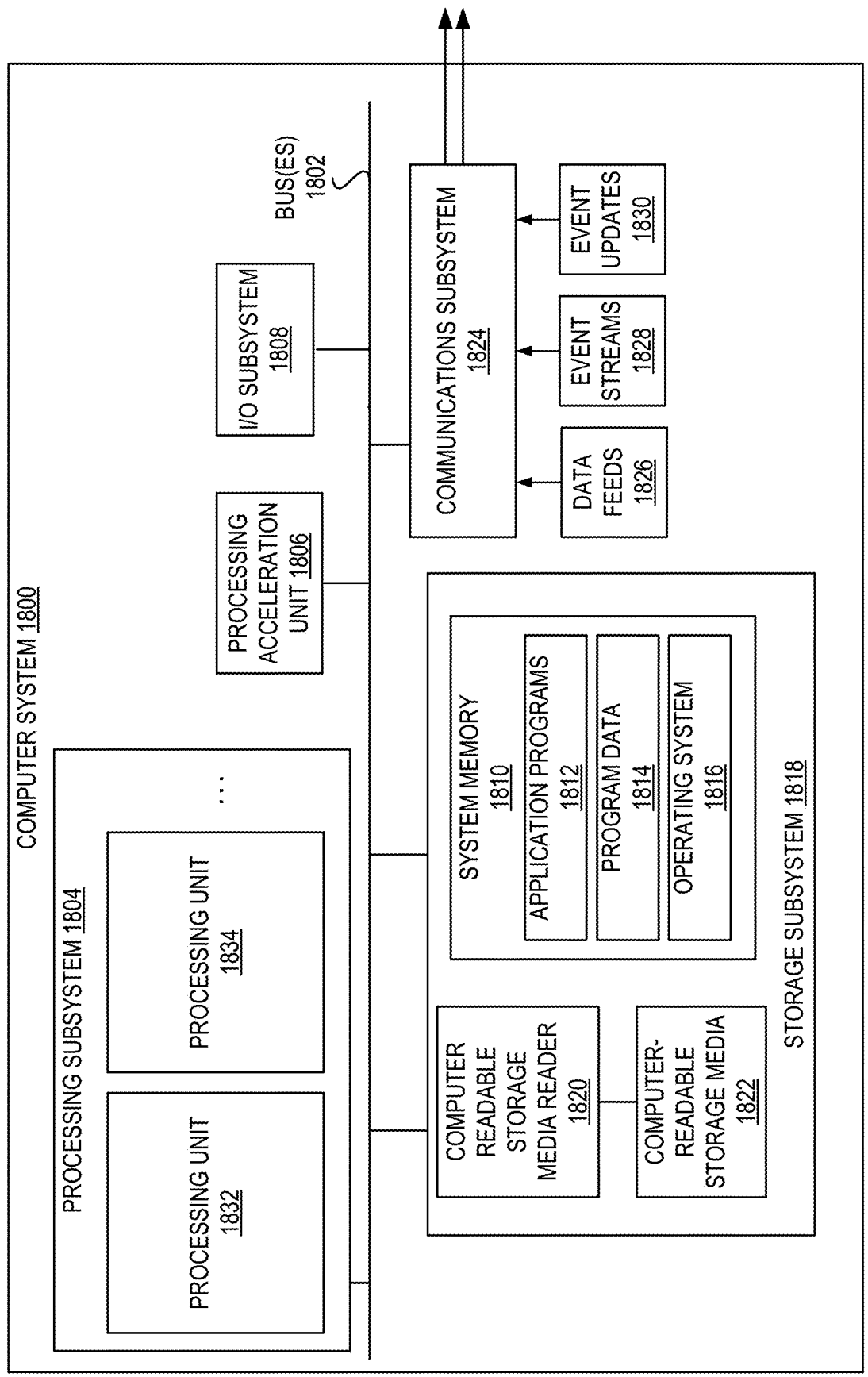
FIG. 18 illustrates an exemplary computer system that may be used to implement an example embodiment, in accordance with some example embodiments.

FIG. 18 illustrates an exemplary computer system 1800 that may be used to implement some example embodiments. In some embodiments, computer system 1800 may be used to implement any of the various servers and computer systems described above. As shown in FIG. 18, computer system 1800 includes various subsystems including a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 may include tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1804 controls the operation of computer system 1800 and may comprise one or more processing units 1832, 1834, etc. A processing unit may include be one or more processors, including single core or multicore processors, one or more cores of processors, or combinations thereof. In some embodiments, processing subsystem 1804 can include one or more special purpose co-processors such as graphics processors, digital signal processors (DSPs), or the like. In some embodiments, some or all of the processing units of processing subsystem 1804 can be implemented using customized circuits, such as application specific integrated circuits (ASICs), or field programmable gate arrays (FPGAs).

In some embodiments, the processing units in processing subsystem 1804 can execute instructions stored in system memory 1810 or on computer readable storage media 1822. In various embodiments, the processing units can execute a variety of programs or code instructions and can maintain multiple concurrently executing programs or processes. At any given time, some or all of the program code to be executed can be resident in system memory 1810 and/or on computer-readable storage media 1822 including potentially on one or more storage devices. Through suitable programming, processing subsystem 1804 can provide various functionalities described above for semantic searching.

In certain embodiments, a processing acceleration unit 1806 may be provided for performing customized processing or for off-loading some of the processing performed by processing subsystem 1804 so as to accelerate the overall processing performed by computer system 1800.

I/O subsystem 1808 may include devices and mechanisms for inputting information to computer system 1800 and/or for outputting information from or via computer system 1800. In general, use of the term "input device" is intended to include all possible types of devices and mechanisms for inputting information to computer system 1800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1818 provides a repository or data store for storing information that is used by computer system 1800. Storage subsystem 1818 provides a tangible non-transitory computer-readable storage medium for storing the basic programming and data constructs that provide the functionality of some embodiments. Software (programs, code modules, instructions) that when executed by processing subsystem 1804 provide the functionality described above may be stored in storage subsystem 1818. The software may be executed by one or more processing units of processing subsystem 1804. Storage subsystem 1818 may also provide a repository for storing data used in accordance with some of the example embodiments.

Storage subsystem 1818 may include one or more non-transitory memory devices, including volatile and non-volatile memory devices. As shown in FIG. 18, storage subsystem 1818 includes a system memory 1810 and a computer-readable storage media 1822. System memory 1810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1800, such as during start-up, may typically be stored in the ROM. The RAM typically contains data and/or program modules that are presently being operated and executed by processing subsystem 1804. In some implementations, system memory 1810 may include multiple different types of memory, such as static random access memory (SRAM) or dynamic random access memory (DRAM).

By way of example, and not limitation, as depicted in FIG. 18, system memory 1810 may store application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1822 may store programming and data constructs that provide the functionality of some embodiments. Software (programs, code modules, instructions) that when executed by processing subsystem 1804 a processor provide the functionality described above may be stored in storage subsystem 1818. By way of example, computer-readable storage media 1822 may include non-volatile memory such as a hard disk drive, a magnetic disk drive, an optical disk drive such as a CD ROM, DVD, a Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1822 may provide storage of computer-readable instructions, data structures, program modules, and other data for computer system 1800.

In certain embodiments, storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for storing computer-readable information.

In certain embodiments, computer system 1800 may provide support for executing one or more virtual machines. Computer system 1800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1800. Accordingly, multiple operating systems may potentially be run concurrently by computer system 1800. Each virtual machine generally runs independently of the other virtual machines.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to establish a communication channel to one or more client computing devices via the Internet for receiving and sending information from and to the client computing devices.

Communication subsystem 1824 may support both wired and/or wireless communication protocols. For example, in certain embodiments, communications subsystem 1824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

Communication subsystem 1824 can receive and transmit data in various forms. For example, in some embodiments, communications subsystem 1824 may receive input communication in the form of structured and/or unstructured data feeds 1826, event streams 1828, event updates 1830, and the like. For example, communications subsystem 1824 may be configured to receive (or send) data feeds 1826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1824 may be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1800 depicted in FIG. 18 is intended only as a specific example. Many other configurations having more or fewer components than the system depicted in FIG. 18 are possible. Based on the disclosure and teachings provided herein, a person of ordinary skill in the art will appreciate other ways and/or methods to implement the various embodiments.

Although example embodiments have been described, various modifications, alterations, alternative constructions, and equivalents are also encompassed within the scope of the example embodiments. The modifications include any relevant combination of the disclosed features. Example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been disclosed, these are not intended to be limiting. Various modifications and equivalents are within the scope of the following claims.

What is claimed is:

1. A method comprising, at a computer system:
generating a word embedding model comprising a first plurality of features for words;
generating an initial matrix, wherein the initial matrix comprises a plurality of rows comprising a plurality of words from a first data set, and a first plurality of columns comprising the first plurality of features from the word embedding model, wherein the first plurality of features are based on single words;
determining one or more values indicating a measure of sentiment for the plurality of words in the initial matrix in relation to each of the first plurality of features, wherein the one or more values are determined using a convolutional neural network;
generating a co-occurrence graph based on the first data set, wherein the co-occurrence graph identifies a relationship between the plurality of words of the first data set;
identifying one or more bigrams in the first data set based on the co-occurrence graph that was generated based on the first data set;
determining a set of bigrams in the co-occurrence graph, that was generated based on the first data set, having a highest frequency of occurrence;

determining a second plurality of features based on the determined set of bigrams in the co-occurrence graph;

updating the initial matrix to generate an updated matrix that includes a second plurality of columns comprising the second plurality of features in addition to the first plurality of columns comprising the first plurality of features, wherein the second plurality of features correspond with the set of determined bigrams in the co-occurrence graph, wherein the second plurality of features are based on a plurality of words;

for each of the second plurality of features, generating, in the updated matrix, an indication of an occurrence of a bigram corresponding to each the plurality of words based on the set of bigrams and the co-occurrence graph; and determining the measure of sentiment for a second data set using the updated matrix.

2. The method according to claim 1, wherein the first plurality of features comprises an attribute that represents a word in the plurality of words.

3. The method according to claim 1, wherein the set of bigrams in the co-occurrence graph having the highest frequency of occurrence among the plurality of words from the first data set are assigned a higher weight than bigrams having a lower frequency of occurrence among the plurality of words from the first data set.

4. The method according to claim 1, wherein the identifying the one or more bigrams in the first data set comprises:
setting a word window size;
parsing a first subset of the plurality of words from the first data set within the word window size; and
removing one or more stop words from the first subset of the plurality of words in the first data set within the word window size.

5. The method according to claim 4, wherein the identifying the one or more bigrams in the first data set further comprises identifying a first pair of words from the first subset within the word window size.

6. The method according to claim 5, further comprising assigning a weight score to the first pair of words identified from the first subset.

7. The method according to claim 6, further comprising:
parsing a second subset of the plurality of words from the first data set within the word window size; and
in response to the first pair of words appearing in the second subset of the plurality of words, incrementing the weight score assigned to the first pair of words.

8. The method according to claim 1, wherein each of the plurality of rows of the initial matrix comprises a single word of the plurality of words, and wherein each of the first plurality of columns of the initial matrix comprises a feature from one of the first plurality of features.

9. The method according to claim 1, wherein the indication of the occurrence of the bigram in the plurality of words comprises a numerical value.

10. A system comprising:
one or more processors;
a memory accessible to the one or more processors, the memory comprising instructions that, when executed by the one or more processors, cause the one or more processors to perform a method comprising:
generating a word embedding model comprising a first plurality of features for words;
generating an initial matrix, wherein the initial matrix comprises a plurality of rows comprising a plurality of words from a first data set, and a first plurality of columns comprising the first plurality of features from the word embedding model, wherein the first plurality of features are based on single words;

determining one or more values indicating a measure of sentiment for the plurality of words in the initial matrix in relation to each of the first plurality of features, wherein the one or more values are determined using a convolutional neural network;

generating a co-occurrence graph based on the first data set, wherein the co-occurrence graph identifies a relationship between the plurality of words of the first data set;

identifying one or more bigrams in the first data set based on the co-occurrence graph that was generated based on the first data set;

determining a set of bigrams in the co-occurrence graph, that was generated based on the first data set, having a highest frequency of occurrence;

determining a second plurality of features based on the determined set of bigrams in the co-occurrence graph;

updating the initial matrix to generate an updated matrix that includes a second plurality of columns comprising the second plurality of features in addition to the first plurality of columns comprising the first plurality of features, wherein the second plurality of features correspond with the set of determined bigrams in the co-occurrence graph, wherein the second plurality of features are based on a plurality of words;

for each of the second plurality of features, generating, in the updated matrix, an indication of an occurrence of a bigram corresponding to each the plurality of words based on the set of bigrams and the co-occurrence graph; and determining the measure of sentiment for a second data set using the updated matrix.

11. The system according to claim 10, wherein the identifying the one or more bigrams in the first data set comprises:
setting a word window size;
parsing a first subset of the plurality of words from the first data set within the word window size; and
removing one or more stop words from the first subset of the plurality of words in the first data set within the word window size.

12. The system according to claim 11, wherein the identifying the one or more bigrams in the first data set further comprises identifying a first pair of words from the first subset within the word window size.

13. The system according to claim 12, further comprising assigning a weight score to the first pair of words identified from the first subset.

14. The system according to claim 13, further comprising:
parsing a second subset of the plurality of words from the first data set within the word window size; and
in response to the first pair of words appearing in the second subset of the plurality of words, incrementing the weight score assigned to the first pair of words.

15. A non-transitory computer readable medium storing a plurality of instructions for controlling a computer system to perform a method comprising:
generating a word embedding model comprising a first plurality of features for words;

generating an initial matrix, wherein the initial matrix comprises a plurality of rows comprising a plurality of words from a first data set, and a first plurality of columns comprising the first plurality of features from the word embedding model, wherein the first plurality of features are based on single words;

determining one or more values indicating a measure of sentiment for the plurality of words in the initial matrix in relation to each of the first plurality of features, wherein the one or more values are determined using a convolutional neural network;

generating a co-occurrence graph based on the first data set, wherein the co-occurrence graph identifies a relationship between the plurality of words of the first data set;

identifying one or more bigrams in the first data set based on the co-occurrence graph that was generated based on the first data set;

determining a set of bigrams in the co-occurrence graph, that was generated based on the first data set, having a highest frequency of occurrence;

determining a second plurality of features based on the determined set of bigrams in the co-occurrence graph;

updating the initial matrix to generate an updated matrix that includes a second plurality of columns comprising the second plurality of features in addition to the first plurality of columns comprising the first plurality of features, wherein the second plurality of features correspond with the set of determined bigrams in the co-occurrence graph, wherein the second plurality of features are based on a plurality of words;

for each of the second plurality of features, generating, in the updated matrix, an indication of an occurrence of a bigram corresponding to each the plurality of words based on the set of bigrams and the co-occurrence graph; and determining the measure of sentiment for a second data set using the updated matrix.

16. The computer readable medium according to claim 15, wherein the identifying the one or more bigrams in the first data set comprises:

setting a word window size;

parsing a first subset of the plurality of words from the first data set within the word window size; and removing one or more stop words from the first subset of the plurality of words in the first data set within the word window size.

17. The computer readable medium according to claim 16, wherein the identifying the one or more bigrams in the first data set further comprises identifying a first pair of words from the first subset within the word window size.

18. The computer readable medium according to claim 17, further comprising assigning a weight score to the first pair of words identified from the first subset.

19. The computer readable medium according to claim 18, further comprising:

parsing a second subset of the plurality of words from the first data set within the word window size; and in response to the first pair of words appearing in the second subset of the plurality of words, incrementing the weight score assigned to the first pair of words.

* * * * *

UNITED STATES PATENT AND TRADEMARK OFFICE
CERTIFICATE OF CORRECTION

PATENT NO. : 10,810,472 B2
APPLICATION NO. : 15/976390
DATED : October 20, 2020
INVENTOR(S) : Malak et al.

It is certified that error appears in the above-identified patent and that said Letters Patent is hereby corrected as shown below:

On the Title Page

Page 2, item [56], Column 2, Line 20, delete "Custering," and insert -- Clustering, --, therefor.

Page 3, item [56], Column 1, Line 49, delete "Efficeint" and insert -- Efficient --, therefor.

Page 3, item [56], Column 2, Lines 51-52, delete "Proceesings" and insert -- Proceedings --, therefor.

In the Specification

Column 4, Line 4, after "embodiments" insert -- . --.

Column 4, Line 13, after "embodiments" insert -- . --.

Columns 13-14, under TABLE 1, Line 4, delete "format," and insert -- format --, therefor.

Column 14, Lines 63-64, delete "hexidecimal" and insert -- hexadecimal --, therefor.

Column 18, Line 27, after "identified)" insert -- . --.

Column 28, Line 27, delete "networks-for-nlp/and" and insert -- networks-for-nlp/ and --, therefor.

Column 29, Line 9, delete "GlobalMaxPoolingID( ))" and insert -- GlobalMaxPooling1D( )) --, therefor.

Column 29, Line 10, delete "GlobalMaxPoolingID( )," and insert -- GlobalMaxPooling1D( ), --, therefor.

Column 29, Line 28, delete "the" and insert -- The --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,810,472 B2

Column 29, Line 66, delete "20vectoo20representation.pdf]," and insert -- 20vector%20representation.pdf], --, therefor.

Column 30, Line 3, delete "of the of the" and insert -- of the --, therefor.

In the Claims

Column 47, Line 15, Claim 1, after "each" insert -- of --.

Column 48, Line 36, Claim 10, after "each" insert -- of --.

Column 50, Line 3, Claim 15, after "each" insert -- of --.